United States Patent
Kobayashi

(10) Patent No.: US 10,310,502 B2
(45) Date of Patent: Jun. 4, 2019

(54) HEAD-MOUNTED DISPLAY DEVICE, CONTROL METHOD THEREFOR, AND COMPUTER PROGRAM

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/863,445

(22) Filed: Jan. 5, 2018

(65) Prior Publication Data

US 2018/0196425 A1 Jul. 12, 2018

(30) Foreign Application Priority Data

Jan. 10, 2017 (JP) ................................. 2017-001682

(51) Int. Cl.
| | | |
|---|---|---|
| *G06T 19/00* | (2011.01) | |
| *G05D 1/00* | (2006.01) | |
| *H04B 7/185* | (2006.01) | |
| *B64C 39/02* | (2006.01) | |
| *G02B 27/01* | (2006.01) | |

(52) U.S. Cl.
CPC ......... *G05D 1/0044* (2013.01); *B64C 39/024* (2013.01); *G02B 27/0172* (2013.01); *G06T 19/006* (2013.01); *H04B 7/18506* (2013.01); *B64C 2201/146* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2013/0038692 A1 | 2/2013 | Ohtomo et al. | |
| 2013/0173088 A1 | 7/2013 | Callou et al. | |
| 2016/0114887 A1* | 4/2016 | Zhou ..................... | B60F 5/02 |
| | | | 348/148 |

(Continued)

FOREIGN PATENT DOCUMENTS

| | | |
|---|---|---|
| JP | 2013-038622 A | 2/2013 |
| JP | 2013-144539 A | 7/2013 |
| JP | 2016-010145 A | 1/2016 |

*Primary Examiner* — Nicholas R Wilson
(74) *Attorney, Agent, or Firm* — Oliff PLC

(57) ABSTRACT

A transmission-type head-mounted display device includes an image display, a control section configured to control the image display section, a position detecting section, a visual-field detecting section configured to detect a visual field of the user, and a wireless communication section configured to perform wireless communication with an external apparatus. The control section includes a state-information acquiring section configured to acquire, via the wireless communication section, state information including a position of an own aircraft, which is a mobile body set as an operation target object of the user, and a support-information creating section configured to create, on the basis of a relation between the position and the visual field of the user and the position of the own aircraft, a support image including support information for operation of the own aircraft and cause the image display section to display the support image as the virtual image.

11 Claims, 21 Drawing Sheets

(56) References Cited

U.S. PATENT DOCUMENTS

| | | | |
|---|---|---|---|
| 2016/0266579 A1* | 9/2016 | Chen | G05D 1/0038 |
| 2017/0026680 A1 | 1/2017 | Sugio et al. | |
| 2017/0076497 A1* | 3/2017 | Inomata | G06F 3/0346 |

* cited by examiner

| AIRCRAFT ID | PRESENT POSITION | ALTI-TUDE | SPEED | DIREC-TION | PREDICTED POSITION | | NOTIFICATION | TRANSMISSION DESTINATION |
|---|---|---|---|---|---|---|---|---|
| KA | PA | HA | SA | DA | PPA | | APPROACH B | ADA |
| KB | PB | HB | SB | DB | PPB | | APPROACH A | ADB |
| KC | PC | HC | SC | DC | PPC | | — | ADC |
| KD | PD | HD | SD | DD | PPD | | — | ADD |
| KE | PE | HE | SE | DE | PPE | | — | ADE |
| KF | PF | HF | SF | DF | PPF | | — | ADF |

HEAD-MOUNTED DISPLAY DEVICE, CONTROL METHOD THEREFOR, AND COMPUTER PROGRAM

BACKGROUND

1. Technical Field

The present invention relates to a head-mounted display device, a control method for the head-mounted display device, and a computer program.

2. Related Art

In recent years, the development of an unmanned aircraft (an unmanned aerial vehicle) capable of being remotely piloted or autonomously flying like a Drone has been in progress. The unmanned aircraft can fly while grasping a flying position and a state of an aircraft with various sensors such as a GPS sensor, an IMU sensor, and an image sensor mounted on the aircraft. In this case, a pilot who performs remote piloting is capable of piloting an own aircraft of the pilot while grasping an approximate altitude and an approximate position of the own aircraft by flying the own aircraft while grasping the own aircraft with the naked eye. A person who monitors the autonomous flight and, in some case, performs control or the pilot of the remote piloting is capable of acquiring, with a device wirelessly communicable with the own aircraft such as a PC or a tablet for monitoring and control or a controller for remote piloting, an image, information concerning the position and the altitude, and the like transmitted from the own aircraft and grasping a state of the aircraft. Note that, in the following explanation, the device wirelessly communicable with the own aircraft is referred to as "remote control device" as well. The pilot of the remote piloting and the person who performs monitoring and the like of the autonomous flight are simply referred to as "operator" as well. The piloting, the monitoring, the control, and the like are simply referred to as "operation" as well.

Note that JP-A-2013-144539 (Patent Literature 1) discloses a control method for enabling a user (a pilot) to intuitively pilot an aircraft by viewing the aircraft and changing inclination of a remote control device.

In a situation in which a plurality of unmanned aircrafts are flying, when the pilot can see the plurality of unmanned aircrafts in the visual field of the pilot, the pilot is likely to lose sight of an own aircraft of the pilot. For example, when the pilot once takes the pilot's eyes off the own aircraft for confirmation of aerially photographed images by the unmanned aircrafts, operation of a remote control device, and the like, the pilot sometimes cannot see which aircraft is the own aircraft piloted by the pilot. In particular, when the pilot takes the pilot's eyes off aircrafts moving at high speed in the air, since the aircrafts are moving at high speed, the pilot easily loses sight of the own aircraft. In a time when the pilot is searching for the aircraft that the pilot once loses sight of, although operation of the aircraft is possible, the aircraft is not controlled or piloted by the operator. It is likely that various inconveniences such as contact with the other aircrafts and contact with constructions and natural objects could occur. Therefore, it is demanded to improve distinctiveness of the own aircraft operated by the operator and improve operability of the own aircraft. Note that such problems are not problems only for the unmanned aircraft but are problems common to remotely operated or automatically operated various unmanned mobile bodies.

SUMMARY

An advantage of some aspects of the invention is to solve at least a part of the problems, and the invention can be implemented as the following aspects.

(1) According to an aspect of the invention, a transmission-type head-mounted display device is provided. The head-mounted display device includes: an image display section configured to, in a state in which the head-mounted display device is mounted on a head of a user, transmit an outside scene to cause the user to visually recognize the outside scene and superimpose a virtual image on the outside scene to cause the user to visually recognize the virtual image; a control section configured to control the image display section; a position detecting section configured to detect a position of the user wearing the image display section; a visual-field detecting section configured to detect a visual field of the user; and a wireless communication section configured to perform wireless communication with an external apparatus. The control section includes: a state-information acquiring section configured to acquire, via the wireless communication section, state information including a position of an own aircraft, which is a mobile body set as an operation target object of the user; and a support-information creating section configured to create, on the basis of a relation between the position and the visual field of the user and the position of the own aircraft, a support image including support information for operation of the own aircraft and cause the image display section to display the support image as the virtual image.

According to the head-mounted display device of the aspect, it is possible to create, on the basis of the relation between the position and the visual field of the user and the position of the own aircraft, the support image including the support information for the operation of the own aircraft, superimposes the support image on the outside scene as the virtual image, and cause the image display section to display the support image. Therefore, the user is capable of performing the operation of the own aircraft while referring to the support image. It is possible to improve operability of the own aircraft.

(2) In the head-mounted display device according to the aspect, the state-information acquiring section may acquire, via a wireless communication path including the wireless communication section, the state information transmitted from the own aircraft to a remote control device used for controlling the own aircraft.

According to the head-mounted display device of the aspect with this configuration, it is possible to easily acquire the state information of the own aircraft and use the state information for the creation of the support image.

(3) In the head-mounted display device according to the aspect, the state-information acquiring section may further acquire, via the wireless communication path, state information of other aircrafts, which are one or more mobile bodies other than the own aircraft, transmitted from the other aircrafts to each of one or more remote control devices used for controlling each of the other aircrafts.

According to the head-mounted display device of the aspect with this configuration, it is possible to easily acquire the state information of the own aircraft and the state information of the other aircrafts and use the state information for the creation of the support image.

(4) In the head-mounted display device according to the aspect, when it is specified on the basis of the relation between the position and the visual field of the user and the position of the own aircraft that the own aircraft is not included in the visual field of the user, the support-information creating section may cause the image display section to display, as the virtual image, an indication image indicating a direction in which the own aircraft is located.

According to the head-mounted display device of the aspect with this configuration, when the own aircraft is absent in the visual field of the user, it is possible to cause the user to recognize a direction in which the own aircraft is present and guide the own aircraft to enter the visual field of the user.

(5) In the head-mounted display device according to the aspect, when it is specified on the basis of the relation between the position and the visual field of the user and the position of the own aircraft that the own aircraft is included in the visual field of the user, the support-information creating section may cause the image display section to display, as the virtual image, a marker image for distinguishing the own aircraft.

According to the head-mounted display device of the aspect with this configuration, the user can easily distinguish the own aircraft present in the visual field.

(6) In the head-mounted display device according to the aspect, the support-information creating section may further cause the image display section to display, to the own aircraft included in the visual field of the user, as the virtual image, moving direction information indicating a moving direction included in the state information of the own aircraft.

According to the head-mounted display device of the aspect with this configuration, the user can easily grasp the moving direction of the own aircraft.

(7) In the head-mounted display device according to the aspect, the support-information creating section may further cause the image display section to display, to the own aircraft included in the visual field of the user, as the virtual image, moving direction information indicating a moving direction included in the state information of the own aircraft and cause the image display section to display, to the other aircrafts included in the visual field of the user, as the virtual image, moving direction information indicating a moving direction included in the state information of the other aircrafts.

According to the head-mounted display device of the aspect with this configuration, the user can easily grasp the moving directions of the own aircraft and the other aircrafts present in the visual field of the user.

(8) In the head-mounted display device according to the aspect, when another aircraft satisfying a first approach condition decided in advance for the own aircraft is present, the support-information creating section may further cause, on the basis of the position of the own aircraft and a predicted position after elapse of a time set in advance included in the state information of the own aircraft and a position of the other aircraft and a predicted position after the elapse of the time decided in advance included in state information of the other aircraft satisfying the first approach condition, the image display section to display, as the virtual image, information indicating an approach state of the other aircraft when the own aircraft and the other aircraft satisfy a second approach condition decided in advance.

According to the head-mounted display device of the aspect with this configuration, the user can easily grasp the approach state of the other aircraft approaching the own aircraft.

(9) In the head-mounted display device according to the aspect, the support-information creating section may change a state of the support image according to a state of the outside scene to make it easy to distinguish the support image from the outside scene.

According to the head-mounted display device of the aspect with this configuration, it is possible to change the state of the support image according to the state of the outside scene to make it easy to distinguish the support image from the outside scene. Therefore, it is possible to improve distinctiveness of the support image with respect to the outside scenes. For example, by changing a color of the support image, thicknesses of lines and characters, and the like according to the outside scene (the sky, clouds, scenery, etc.), it is possible to improve the distinctiveness of the support image with respect to the outside scene.

The invention can also be realized in various forms other than the head-mounted display device. The invention can be realized as, for example, a control method for the head-mounted display device, a computer program for realizing functions of components included in the head-mounted display device, and a recording medium having the computer program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A1. Configuration of an Operation Support System

Figure 1:
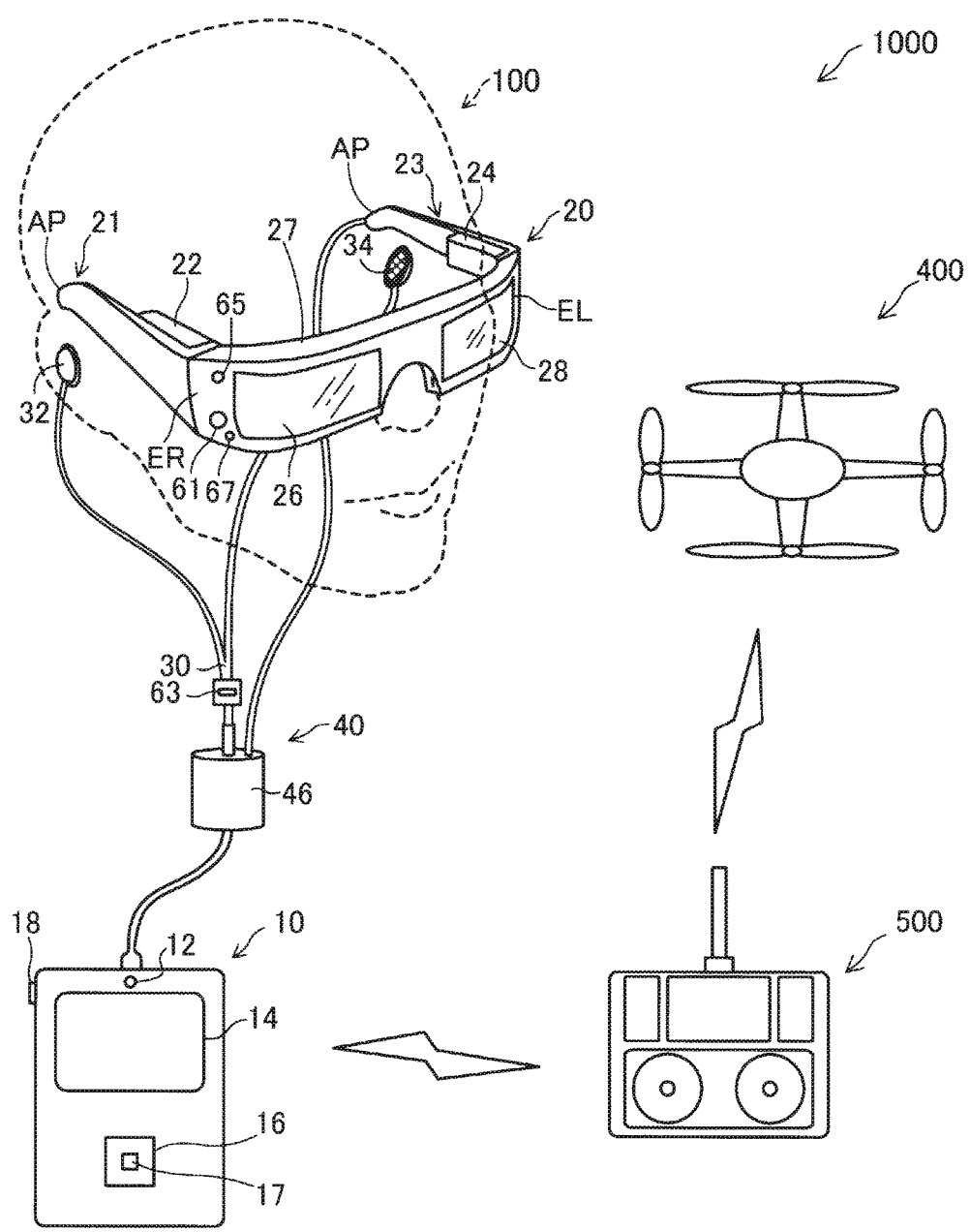
FIG. 1 is an explanatory diagram showing a schematic configuration of an operation support system in a first embodiment.

FIG. 1 is an explanatory diagram showing a schematic configuration of an operation support system in a first embodiment of the invention. An operation support system. 1000 includes a head-mounted display device 100, an unmanned aircraft 400, and a remote control device 500.

As explained below, the head-mounted display device 100 provides information concerning a state of the unmanned aircraft 400 (state information) to a user of the head-mounted display device 100 in order to support operation of the unmanned aircraft 400.

The head-mounted display device 100 is a display device mounted on the head of the user and is also called head mounted display (HMD). The HMD 100 is a head-mounted display device of a see-through type (a transmission type) that causes an image to emerge in an outside world visually recognized through glass. The user is an operator who operates the unmanned aircraft 400.

The HMD 100 includes an image display section 20 that causes the user to visually recognize an image and a control device (a controller) 10 that controls the image display section 20.

The image display section 20 is a wearing body worn on the head of the user. In this embodiment, the image display section 20 has an eyeglass shape. The image display section 20 includes a right display unit 22, a left display unit 24, a right light guide plate 26, and a left light guide plate 28 in a main body including a right holding section 21, a left holding section 23, and a front frame 27.

The right holding section 21 and the left holding section 23 respectively extend backward from both end portions of the front frame 27 and, like temples of eyeglasses, hold the image display section 20 on the head of the user. Of both the end portions of the front frame 27, the end portion located on the right side of the user in a worn state of the image display section 20 is represented as an end portion ER and the end portion located on the left side of the user is represented as an end portion EL. The right holding section 21 is provided to extend from the end portion ER of the front frame 27 to a position corresponding to the right temporal region of the user in the worn state of the image display section 20. The left holding section 23 is provided to extend from the end portion EL of the front frame 27 to a position corresponding to the left temporal region of the user in the worn state of the image display section 20.

The right light guide plate 26 and the left light guide plate 28 are provided in the front frame 27. The right light guide plate 26 is located in front of the right eye of the user in the worn state of the image display section 20 and causes the right eye to visually recognize an image. The left light guide plate 28 is located in front of the left eye of the user in the worn state of the image display section 20 and causes the left eye to visually recognize the image.

The front frame 27 has a shape obtained by coupling one end of the right light guide plate 26 and one end of the left light guide plate 28 to each other. A position of the coupling corresponds to a position in the middle of the forehead of the user in the worn state of the image display section 20. In the front frame 27, a nose pad section in contact with the nose of the user in the worn state of the image display section 20 may be provided in the coupling position of the right light guide plate 26 and the left light guide plate 28. In this case, the image display section 20 can be held on the head of the user by the nose pad section and the right holding section 21 and the left holding section 23. A belt in contact with the back of the head of the user in the worn state of the image display section 20 may be coupled to the right holding section 21 and the left holding section 23. In this case, the image display section 20 can be held on the head of the user by the belt.

The right display unit 22 performs display of an image by the right light guide plate 26. The right display unit 22 is provided in the right holding section 21 and located in the vicinity of the right temporal region of the user in the worn state of the image display section 20. The left display unit 24 performs display of an image by the left light guide plate 28. The left display unit 24 is provided in the left holding section 23 and located in the vicinity of the left temporal region of the user in the worn state of the image display section 20. Note that the right display unit 22 and the left display unit 24 are collectively referred to as "display driving section" as well.

The right light guide plate 26 and the left light guide plate 28 in this embodiment are optical sections (e.g., prisms) formed of light transmissive resin or the like. The right light guide plate 26 and the left light guide plate 28 guide image lights output by the right display unit 22 and the left display unit 24 to the eyes of the user. Note that a dimming plate may be provided on the surfaces of the right light guide plate 26 and the left light guide plate 28. The dimming plate is a thin plate-like optical element having different transmittance depending on a wavelength region of light. The dimming plate functions as a so-called wavelength filter. For example, the dimming plate is disposed to cover a surface (a surface on the opposite side of a surface opposed to the eyes of the user) of the front frame 27. By selecting an optical characteristic of the dimming plate as appropriate, it is possible to adjust the transmittances of lights in any wavelength regions such as visible light, infrared light, and ultraviolet light. It is possible to adjust a light amount of external light made incident on the right light guide plate 26 and the left light guide plate 28 from the outside and transmitted through the right light guide plate 26 and the left light guide plate 28.

The image display section 20 guides image lights respectively generated by the right display unit 22 and the left display unit 24 to the right light guide plate 26 and the left light guide plate 28 and causes the user to visually recognize an image (an augmented reality (AR) image) with the image lights (this is referred to as "display an image" as well). When the external light is transmitted through the right light guide plate 26 and the left light guide plate 28 and made incident on the eyes of the user from the front of the user, the image lights forming the image and the external light are superimposed and made incident on the eyes of the user. Therefore, visibility of the image in the user is affected by the intensity of the external light.

Therefore, it is possible to adjust easiness of the visual recognition of the image by, for example, attaching the dimming plate to the front frame 27 and selecting or adjusting the optical characteristic of the dimming plate as appropriate. In a typical example, it is possible to select a dimming plate having light transmittance of a degree for enabling the user wearing the HMD 100 to visually recognize at least a scene on the outside. It is possible to suppress the sunlight and improve the visibility of the image. When the dimming plate is used, it is possible to expect an effect of protecting the right light guide plate 26 and the left light guide plate 28 and suppressing damage, adhesion of soil, and the like to the right light guide plate 26 and the left light guide plate 28. The dimming plate may be detachably attachable to the front frame 27 or each of the right light guide plate 26 and the left light guide plate 28. A plurality of kinds of dimming plates may be able to be alternately attached. The dimming plates may be omitted.

A camera 61 is disposed in the front frame 27 of the image display section 20. The camera 61 is provided in a position where the camera 61 does not block external light transmitted through the right light guide plate 26 and the left light guide plate 28 on the front surface of the front frame 27. In the example shown in FIG. 1, the camera 61 is disposed on the end portion ER side of the front frame 27. The camera 61 may be disposed on the end portion EL side of the front frame 27 or may be disposed in a coupling section of the right light guide plate 26 and the left light guide plate 28.

The camera 61 is a digital camera including an imaging device such as a CCD or a CMOS and an imaging lens. The camera 61 in this embodiment is a monocular camera. However, a stereo camera may be adopted. The camera 61 images at least a part of an outside scene (a real space) in a front side direction of the HMD 100, in other words, a visual field visually recognized by the user in the worn state of the image display section 20. In other words, the camera 61 images a range or a direction overlapping the visual field of the user and images a direction gazed by the user. The breadth of an angle of view of the camera 61 can be set as appropriate. In this embodiment, the breadth of the angle of view of the camera 61 is set to image the entire visual field of the user visually recognizable by the user through the right light guide plate 26 and the left light guide plate 28. The camera 61 executes the imaging according to control by a control function section 150 (FIG. 5) and outputs obtained captured image data to the control function section 150.

The HMD 100 may include a distance measurement sensor that detects a distance to a measurement target object located in a preset measurement direction. The distance measurement sensor can be disposed in, for example, a coupling portion of the right light guide plate 26 and the left light guide plate 28 in the front frame 27. A measurement direction of the distance measurement sensor can be set to the front side direction of the HMD 100 (a direction overlapping the imaging direction of the camera 61). The distance sensor can be configured by, for example, a light emitting section such as an LED or a laser diode and a light receiving section that receives reflected light of light emitted by a light source and reflected on the measurement target object. In this case, the distance is calculated by triangulation processing and distance measurement processing based on a time difference. The distance sensor may be configured by, for example, an emitting section that emits ultrasound and a receiving section that receives the ultrasound reflected on the measurement target object. In this case, the distance is calculated by the distance measurement processing based on a time difference. Like the camera 61, the distance measurement sensor is controlled by the control function section 150 and outputs a detection result to the control function section 150.

Figure 2:
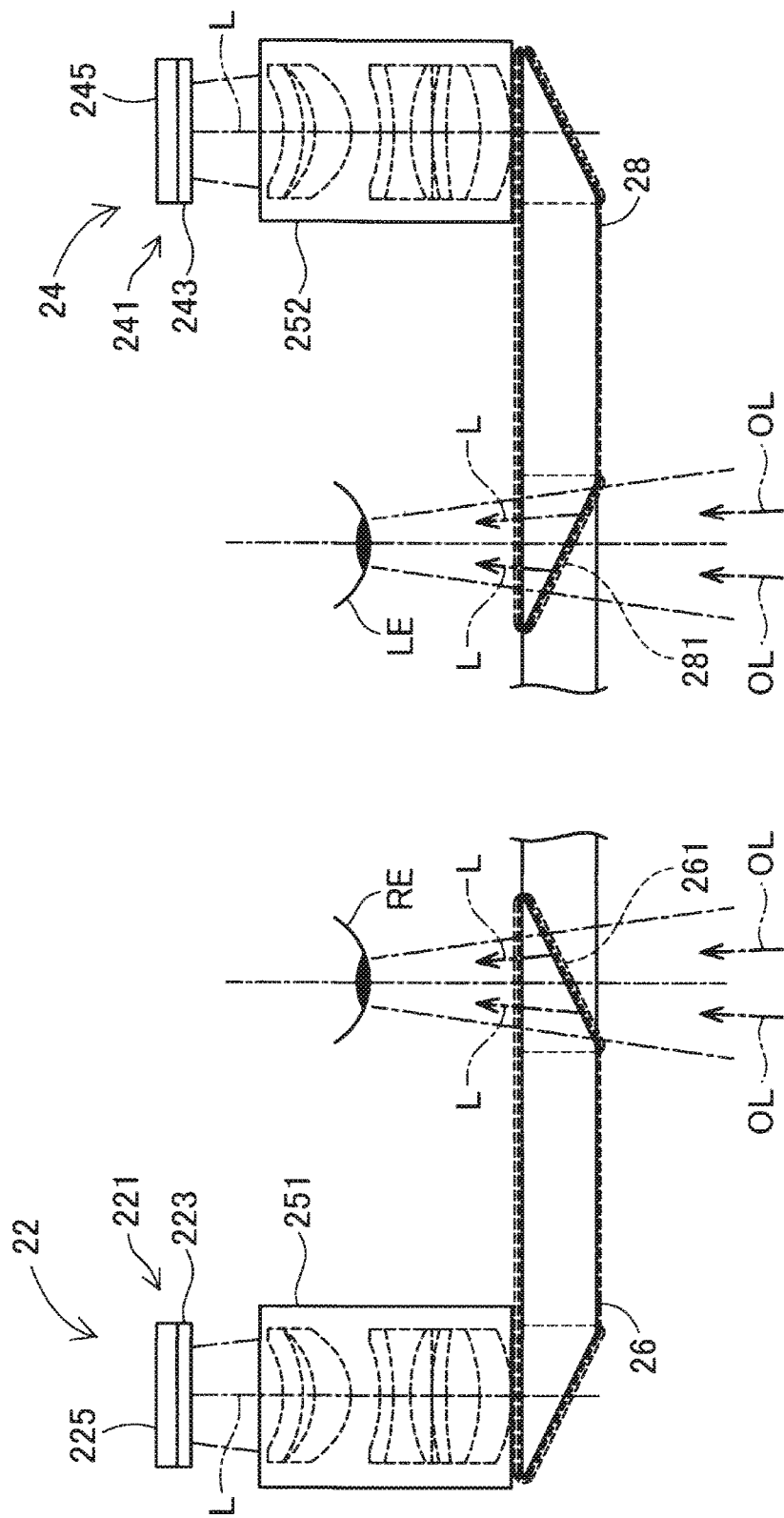
FIG. 2 is a main part plan view showing the configuration of an optical system included in an image display section.

FIG. 2 is a main part plan view showing the configuration of an optical system included in the image display section 20. In FIG. 2, a right eye RE and a left eye LE of the user are shown for convenience of explanation. As shown in FIG. 2, the right display unit 22 and the left display unit 24 are symmetrically configured.

As components for causing the right eye RE to visually recognize an image (an AR image), the right display unit 22 includes an OLED (Organic Light Emitting Diode) unit 221 and a right optical system 251. The OLED unit 221 emits image light L. The right optical system 251 includes a lens group and guides the image light L emitted by the OLED unit 221 to the right light guide plate 26.

The OLED unit 221 includes an OLED panel 223 and an OLED driving circuit 225 that drives the OLED panel 223. The OLED panel 223 is a self-emitting display panel configured by light emitting elements that emit lights with organic electroluminescence and respectively emit color lights of R (red), G (green), and B (blue). In the OLED panel 223, a plurality of pixels, one pixel of which is a unit including one each of R, G, and B elements, are arranged in a matrix shape.

Figure 5:
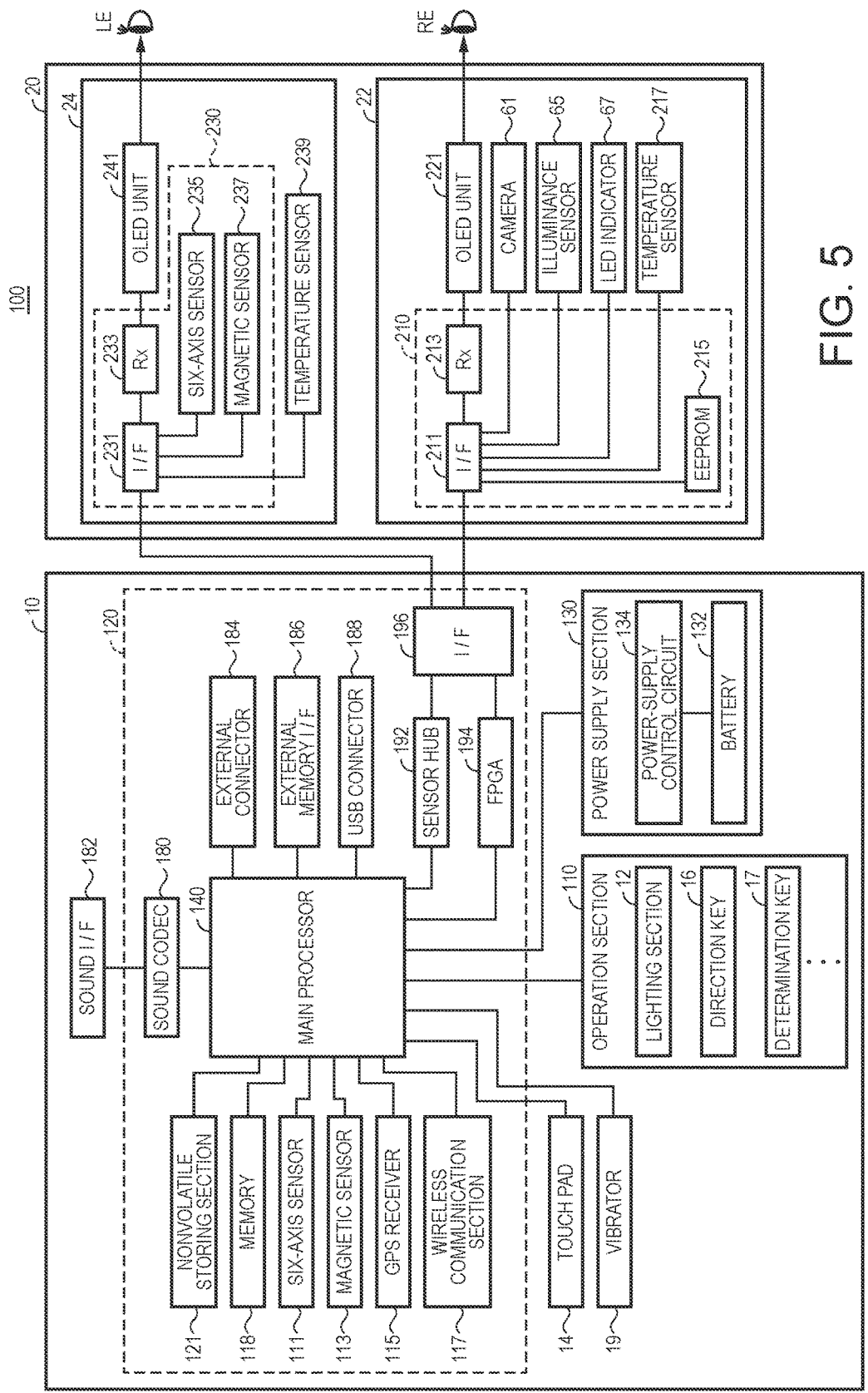
FIG. 5 is a block diagram functionally showing the configuration of an HMD.

The OLED driving circuit 225 executes selection of a light emitting element included in the OLED panel 223 and energization to the light emitting element and causes the light emitting element to emit light according to the control by the control function section 150 (FIG. 5). The OLED driving circuit 225 is fixed to the rear side of a rear surface, that is, a light emitting surface of the OLED panel 223 by bonding or the like. The OLED driving circuit 225 may be configured by, for example, a semiconductor device that drives the OLED panel 223 and mounted on a substrate fixed to the rear surface of the OLED panel 223. A temperature sensor 217 (FIG. 5) explained below is mounted on the substrate. Note that, as the OLED panel 223, a configuration may be adopted in which light emitting elements that emit white light are arranged in a matrix shape and color filters corresponding to the colors of R, G, and B are disposed to be superimposed one on top of another. The OLED panel 223 of a WRGB configuration including a light emitting element that emits W (white) light in addition to the light emitting elements that respectively emit the color lights of R, G, and B may be adopted.

The right optical system 251 includes a collimate lens that changes the image light L emitted from the OLED panel 223 to a light beam in a parallel state. The image light L changed to the light beam in the parallel state by the collimate lens is made incident on the right light guide plate 26. A plurality of reflection surfaces that reflect the image light L are formed in an optical path for guiding light on the inside of the right light guide plate 26. The image light L is guided to the right eye RE side through a plurality of times of reflection on the inside of the right light guide plate 26. A half mirror 261 (a reflection surface) located in front of the right eye RE is formed in the right light guide plate 26. The image light L is reflected on the half mirror 261 and thereafter emitted from the right light guide plate 26 toward the right eye RE. The image light L forms an image on the retina of the right eye RE to cause the user to visually recognize the image.

The left display unit 24 includes, as components for causing the left eye LE to visually recognize an image (an AR image), an OLED unit 241 and a left optical system 252. The OLED unit 241 emits image light. The left optical system 252 includes a lens group and guides the image light L emitted by the OLED unit 241 to the left light guide plate 28. The OLED unit 241 includes an OLED panel 243 and an OLED driving circuit 245 that drives the OLED panel 243. Details of the sections are the same as the details of the OLED unit 221, the OLED panel 223, and the OLED driving circuit 225. A temperature sensor 239 (FIG. 5) is mounted on a substrate fixed to the rear surface of the OLED panel 243. Details of the left optical system 252 are the same as the details of the right optical system 251.

With the configuration explained above, the HMD 100 can function as a see-through type display device. That is, the image light L reflected on the half mirror 261 and external light OL transmitted through the right light guide plate 26 are made incident on the right eye RE of the user. The image light L reflected on a half mirror 281 and the external light OL transmitted through the left right guide plate 28 are made incident on the left eye LE of the user. In this way, the HMD 100 makes the image light L of the image processed on the inside and the external light OL incident on the eyes of the user to be superimposed one on top of the other. As a result, for the user, the outside scene (the real world) is seen through the right light guide plate 26 and the left light guide plate 28. A virtual image (an AR image) formed by the image light L is visually recognized over the outside scene.

The half mirrors 261 and 281 function as "image extracting sections" that reflect image lights respectively output by the right display unit 22 and the left display unit 24 and extract images. The right optical system 251 and the right light guide plate 26 are collectively referred to as "right light guide section" as well. The left optical system 252 and the left light guide plate 28 are collectively referred to as "left light guide section" as well. The configuration of the right light guide section and the left guide section is not limited to the example explained above. Any system can be used as long as the right light guide section and the left guide section form an image in front of the eyes of the user using image light. For example, as the right light guide section and the left light guide section, a diffraction grating may be used or a semitransmitting reflection film may be used.

In FIG. 1, the control device 10 and the image display section 20 are connected by a connection cable 40. The connection cable 40 is detachably connected to a connector provided in a lower part of the control device 10 and is connected from the distal end of the left holding section 23 to various circuits inside the image display section 20. The connection cable 40 includes a metal cable or an optical fiber cable for transmitting digital data. The connection cable 40 may further include a metal cable for transmitting analog data. A connector 46 is provided halfway in the connection cable 40.

The connector 46 is a jack to which a stereo mini plug is connected. The connector 46 and the control device 10 are connected by, for example, a line for transmitting an analog sound signal. In a configuration example shown in FIG. 1, ahead set 30 including a right earphone 32 and a left earphone 34 configuring a stereo headphone and a microphone 63 is connected to the connector 46.

For example, as shown in FIG. 1, the microphone 63 is disposed such that a sound collecting section of the microphone 63 faces a line of sight direction of the user. The microphone 63 collects sound and outputs a sound signal to a sound interface 182 (FIG. 5). The microphone 63 may be a monaural microphone or may be a stereo microphone, may be a microphone having directivity, or may be a nondirectional microphone.

The control device 10 is a device for controlling the HMD 100. The control device 10 includes a lighting section 12, a touch pad 14, a direction key 16, a determination key 17, and a power switch 18. The lighting section 12 notifies, with a light emitting form thereof, an operation state (e.g., ON or OFF of a power supply) of the HMD 100. As the lighting section 12, for example, an LED (Light Emitting Diode) can be used.

The touch pad 14 detects touch operation on an operation surface of the touch pad 14 and outputs a signal corresponding to detection content. As the touch pad 14, various kinds of touch pads such as an electrostatic type, a pressure detection type, and an optical type can be adopted. The direction key 16 detects pressing operation on keys corresponding to the upward, downward, left, and right directions and outputs a signal corresponding to detection content. The determination key 17 detects pressing operation and outputs a signal for determining content of operation in the control device 10. The power switch 18 detects slide operation of the switch to change a state of the power supply of the HMD 100.

Figure 3:
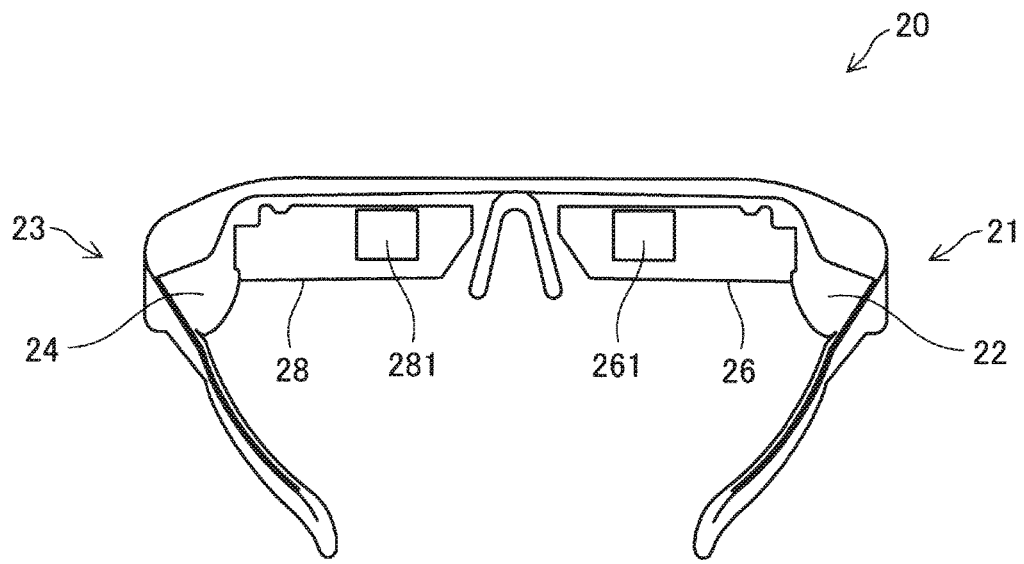
FIG. 3 is a diagram showing a main part configuration of the image display section viewed from a user.

FIG. 3 is a diagram showing a main part configuration of the image display section 20 viewed from the user. In FIG. 3, the connection cable 40, the right earphone 32, and the left earphone 34 are not shown. In a state shown in FIG. 3, the rear sides of the right light guide plate 26 and the left light guide plate 28 can be visually recognized. The half mirror 261 for irradiating image light on the right eye RE and the half mirror 281 for irradiating image light on the left eye LE can be visually recognized as substantially square regions. The user visually recognizes an outside scene through the entire left and right light guide plates 26 and 28 including the half mirrors 261 and 281 and visually recognizes rectangular display images in the positions of the half mirrors 261 and 281.

Figure 4:
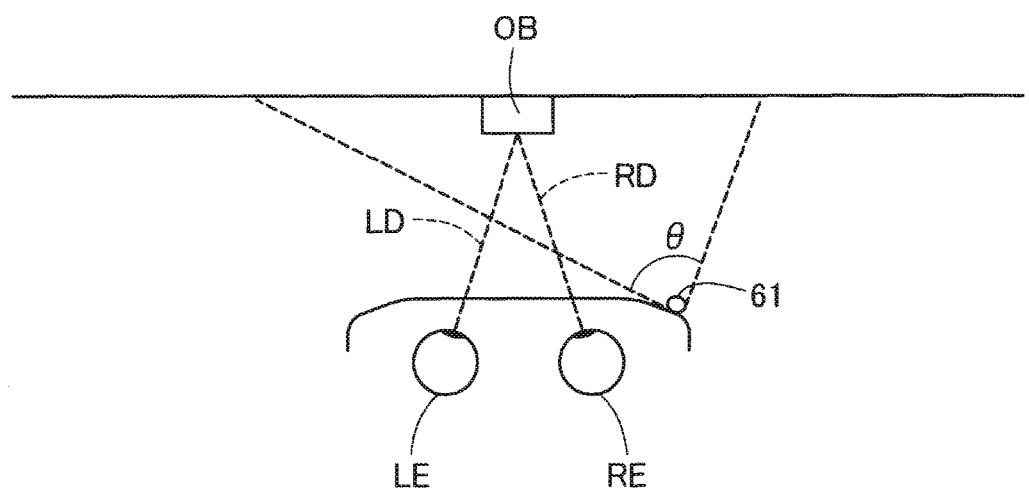
FIG. 4 is a diagram for explaining an angle of view of a camera.

FIG. 4 is a diagram for explaining an angle of view of the camera 61. In FIG. 4, the camera 61 and the right eye RE and the left eye LE of the user are schematically shown in plan view. The angle of view (an imaging range) of the camera 61 is indicated by θ. Note that the angle of view θ of the camera 61 expands in the horizontal direction and also expands in the vertical direction like a general digital camera.

As explained above, the camera 61 is disposed at the end portion on the right side in the image display section 20. The camera 61 images a direction of a line of sight of the user (i.e., the front direction of the user). Therefore, an optical axis of the camera 61 is set in a direction including line of sight directions of the right eye RE and the left eye LE. An outside scene that can be visually recognized by the user in a state in which the user wears the HMD 100 is not always infinity. For example, when the user gazes an object OB with both the eyes, lines of sight of the user are directed to the object OB as indicated by signs RD and LD in the figure. In this case, the distance from the user to the object OB is often approximately 30 cm to 10 m and more often approximately 1 m to 4 m. Therefore, concerning the HMD 100, standards of an upper limit and a lower limit of the distance from the user to the object OB during a normal use may be set. The standards may be calculated in advance and preset in the HMD 100 or may be set by the user. An optical axis and an angle of view of the camera 61 are desirably set such that the object OB is included in the angle of view when the distance to the object OB during the normal use is equivalent to the set standards of the upper limit and the lower limit.

In general, an angular field of view of a human is approximately 200 degrees in the horizontal direction and approximately 125 degrees in the vertical direction. In the angular field of view, an effective field of view excellent in an information reception ability is approximately 30 degrees in the horizontal direction and approximately 20 degrees in the vertical direction. A stable field of fixation in which a gazing point gazed by the human is quickly and stably seen is approximately 60 to 90 degrees in the horizontal direction and approximately 45 to 70 degrees in the vertical direction. In this case, when the gazing point is the object OB (FIG. 4), a field of view of approximately 30 degree in the horizontal direction and approximately 20 degrees in the vertical direction centering on the lines of sight RD and LD is the effective field of view. A field of view of approximately 60 to 90 degrees in the horizontal direction and approximately 45 to 70 degrees in the vertical direction is the stable field of fixation. An actual field of view visually recognized by the user through the image display section 20 and through the right light guide plate 26 and the left light guide plate 28 is referred to as real field of view (FOV). The real field of view is narrower than the angular field of view and the stable field of fixation but is wider than the effective field of view. Note that the real field of view is equivalent to the "visual field".

The angle of view θ of the camera 61 is set to enable imaging of a range wider than the field of view of the user. The angle of view θ of the camera 61 is desirably set to enable imaging of a range wider than at least the effective field of view of the user. The angle of view θ of the camera 61 is more desirably set to enable imaging of a range wider than the real field of view of the user. The angle of view θ of the camera 61 is still more desirably set to enable imaging of a range wider than the stable field of fixation. The angle of view θ is most desirably set to enable imaging of a range wider than the angular field of view of both the eyes of the user. Therefore, the camera 61 may include a so-called wide-angle lens as an imaging lens and may be capable of imaging a wide angle of view. The wide-angle lens may include lenses called super-wide angle lens and semi-wide angle lens. The camera 61 may include a single focus lens, may include a zoom lens, and may include a lens group including a plurality of lenses.

FIG. 5 is a block diagram functionally showing the configuration of the HMD 100. The control device 10 includes a main processor 140 that executes a computer program to control the HMD 100, a storing section, an input/output section, sensors, an interface, and a power supply section 130. The storing section, the input/output section, the sensors, the interface, and the power supply section 130 are connected to the main processor 140. The main processor 140 is mounted on a controller board 120 incorporated in the control device 10.

The storing section includes a memory 118 and a nonvolatile storing section 121. The memory 118 configures a work area that temporarily stores computer programs executed by the main processor 140 and data processed by the main processor 140. The nonvolatile storing section 121 is configured by a flash memory or an eMMC (embedded Multi Media Card). The nonvolatile storing section 121 stores the computer programs executed by the main processor 140 and various data processed by the main processor 140. In this embodiment, these storing sections are mounted on the controller board 120.

The input/output section includes the touch pad 14 and an operation section 110. The operation section 110 includes the direction key 16, the determination key 17, and the power switch 18 included in the control device 10. The main processor 140 controls these input/output sections and acquires signals output from the input/output sections.

The sensors include a six-axis sensor 111, a magnetic sensor 113, and a GPS (Global Positioning System) receiver 115. The six-axis sensor 111 is a motion sensor (an inertial sensor) including a three-axis acceleration sensor and a three-axis gyro (angular velocity) sensor. As the six-axis sensor 111, an IMU (Inertial Measurement Unit) obtained by modularizing the sensors may be adopted. The magnetic sensor 113 is, for example, a three-axis terrestrial magnetism sensor. The GPS receiver 115 includes a not-shown GPS antenna, receives radio signals transmitted from GPS satellites, and detects a coordinate of a present position of the control device 10. The sensors (the six-axis sensor 111, the magnetic sensor 113, and the GPS receiver 115) output detection values to the main processor 140 according to a sampling frequency designated in advance. Timing when the sensors output the detection values may correspond to an instruction from the main processor 140. Note that the GPS receiver 115 cooperates with the control function section 150 to function as a "position detecting section" that specifies a present position of the user wearing the HMD 100.

The interface includes a wireless communication section 117, a sound codec 180, an external connector 184, an external memory interface 186, a USB (Universal Serial Bus) connector 188, a sensor hub 192, an FPGA 194, and an interface 196. These components function as interfaces with the outside. The wireless communication section 117 executes wireless communication between the HMD 100 and an external apparatus. The wireless communication section 117 includes an antenna, an RF circuit, a baseband circuit, and a communication control circuit not shown in the figure. Alternatively, the wireless communication section 117 is configured as a device obtained by integrating these components. The wireless communication section 117 performs wireless communication conforming to standards such as Bluetooth (registered trademark) and a wireless LAN including Wi-Fi (registered trademark).

The sound codec 180 is connected to the sound interface 182 and performs encoding/decoding of sound signals input and output via the sound interface 182. The sound interface 182 is an interface that inputs and outputs sound signals. The sound codec 180 may include an A/D converter that performs conversion from an analog sound signal into digital sound data and a D/A converter that performs conversion opposite to the conversion of the A/D converter. The HMD 100 in this embodiment outputs sound from the right earphone 32 and the left earphone 34 and collects sound with the microphone 63. The sound codec 180 converts digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector for connecting external devices (e.g., a personal computer, a smart phone, and a game machine), which communicate with the main processor 140, to the main processor 140. The external devices connected to the external connector 184 can be supply sources of contents and can be used for debagging of a computer program executed by the main processor 140 and collection of an operation log of the HMD 100. Various forms can be adopted as the external connector 184. As the external connector 184, for example, interfaces adapted to wired connection such as a USB interface, a micro USB interface, and an interface for memory card and interfaces adapted to wireless connection such as a wireless LAN interface and a Bluetooth interface can be adopted.

The external memory interface 186 is an interface to which a portable memory device is connectable. The external memory interface 186 includes, for example, a memory card slot, into which a card-type recording medium is inserted to enable reading and writing of data, and an interface circuit. A size, a shape, a standard, and the like of the card-type recording medium can be selected as appropriate. The USB connector 188 is an interface to which a memory device, a smartphone, a personal computer, and the like confirming to the USB standard are connectable. The USB connector 188 includes, for example, a connector conforming to the USB standard and an interface circuit. A size and a shape of the USB connector 188, a version of the USB standard, and the like can be selected as appropriate.

The HMD 100 includes a vibrator 19. The vibrator 19 includes a not-shown motor and a not-shown eccentric rotor. The vibrator 19 generates vibration according to the control by the main processor 140. For example, when operation on the operation section 110 is detected or when the power supply of the HMD 100 is turned on and off, the HMD 100 generates vibration with the vibrator 19 in a predetermined vibration pattern. The vibrator 19 may be provided on the image display section 20 side, for example, in the right holding section 21 of the image display section 20 (a right side portion of the temple) instead of being provided in the control device 10.

The sensor hub 192 and the FPGA 194 are connected to the image display section 20 via the interface (I/F) 196. The sensor hub 192 acquires detection values of the various sensors included in the image display section 20 and outputs the detection values to the main processor 140. The FPGA 194 executes processing of data transmitted and received between the main processor 140 and the sections of the image display section 20 and transmission of the data via the interface 196. The interface 196 is connected to the right display unit 22 and the left display unit 24 of the image display section 20. In an example in this embodiment, the connection cable 40 is connected to the left holding section 23. A wire connected to the connection cable 40 is laid inside the image display section 20. Each of the right display unit 22 and the left display unit 24 is connected to the interface 196 of the control device 10.

The power supply section 130 includes a battery 132 and a power-supply control circuit 134. The power supply section 130 supplies electric power for the control device 10 to operate. The battery 132 is a chargeable battery. The power-supply control circuit 134 performs detection of a residual capacity of the battery 132 and control of charging to an OS 143. The power-supply control circuit 134 is connected to the main processor 140 and outputs a detection value of the residual capacity of the battery 132 or a detection value of a voltage of the battery 132 to the main processor 140. The control device 10 may supply electric power to the image display section 20 on the basis of the electric power supplied by the power supply section 130. The main processor 140 may be capable of controlling a supply state of electric power from the power supply section 130 to the sections of the control device 10 and the image display section 20.

The right display unit 22 includes a display unit board 210, the OLED unit 221, the camera 61, an illuminance sensor 65, an LED indicator 67, and the temperature sensor 217. An interface (I/F) 211 connected to the interface 196, a receiving section (Rx) 213, and an EEPROM (Electrically Erasable Programmable Read-Only Memory) 215 are mounted on the display unit board 210. The receiving section 213 receives data input from the control device 10 via the interface 211. When receiving image data of an image displayed on the OLED unit 221, the receiving section 213 outputs the received image data to the OLED driving circuit 225 (FIG. 2).

The EEPROM 215 stores various data in a form readable by the main processor 140. The EEPROM 215 stores, for example, data concerning a light emission characteristic and a display characteristic of the OLED units 221 and 241 of the image display section 20 and data concerning characteristics of the sensors of the right display unit 22 or the left display unit 24. Specifically, the EEPROM 215 stores, for example, parameters related to gamma correction of the OLED units 221 and 241, data for compensating for detection values of the temperature sensors 217 and 239, and the like. These data are generated by a test during factory shipment of the HMD 100 and written in the EEPROM 215. After the shipment, the main processor 140 reads the data in the EEPROM 215 and uses the data for various kinds of processing.

The camera 61 executes imaging according to a signal input via the interface 211 and outputs captured image data or a signal indicating an imaging result to the control device 10. As shown in FIG. 1, the illuminance sensor 65 is provided at the end portion ER of the front frame 27 and disposed to receive external light from the front of the user wearing the image display section 20. The illuminance sensor 65 outputs a detection value corresponding to a received light amount (light reception intensity). As shown in FIG. 1, the LED indicator 67 is disposed near the camera 61 at the end portion ER of the front frame 27. The LED indicator 67 is lit during execution of imaging by the camera 61 to inform that the imaging is being performed.

The temperature sensor 217 detects temperature and outputs a voltage value or a resistance value corresponding to the detected temperature. The temperature sensor 217 is mounted on the rear surface side of the OLED panel 223 (FIG. 3). The temperature sensor 217 may be mounted on, for example, the same substrate as the OLED driving circuit 225. With this configuration, the temperature sensor 217 mainly detects the temperature of the OLED panel 223. Note that the temperature sensor 217 may be incorporated in the OLED panel 223 or the OLED driving circuit 225. For example, when the OLED panel 223 functioning as an Si-OLED is mounted as an integrated circuit on an integrated semiconductor chip together with the OLED driving circuit 225, the temperature sensor 217 may be mounted on the semiconductor chip.

The left display unit 24 includes a display unit board 230, the OLED unit 241, and the temperature sensor 239. An interface (I/F) 231 connected to the interface 196, a receiving section (Rx) 233, a six-axis sensor 235, and a magnetic sensor 237 are mounted on the display unit board 230. The receiving section 233 receives data input from the control device 10 via the interface 231. When receiving image data of an image displayed on the OLED unit 241, the receiving section 233 outputs the received image data to the OLED driving circuit 245 (FIG. 2).

The six-axis sensor 235 is a motion sensor (an inertial sensor) including a three-axis acceleration sensor and a three-axis gyro (angular velocity) sensor. As the six-axis sensor 235, an IMU sensor obtained by modularizing the sensors may be adopted. The magnetic sensor 237 is, for example, a three-axis terrestrial magnetism sensor. The six-axis sensor 235 and the magnetic sensor 237 are provided in the image display section 20. Therefore, when the image display section 20 is worn on the head of the user, the six-axis sensor 235 and the magnetic sensor 237 detect a movement of the head of the user. The direction of the image display section 20 is specified and the visual field of the user is specified from the detected movement of the head. As explained above, the six-axis sensor 235 and the magnetic sensor 237 cooperate with the control function section 150 explained below to thereby function as the "visual-field detecting section" that specifies the visual field of the user. Note that the control function section 150 is also capable of specifying the direction of the image display section 20 and the visual field of the user using an imaging result of the camera 61, radio wave intensity of wireless communication from the unmanned aircraft 400.

The temperature sensor 239 detects temperature and outputs a voltage value or a resistance value corresponding to the detected temperature. The temperature sensor 239 is mounted on the rear surface side of the OLED panel 243 (FIG. 3). The temperature sensor 239 may be mounted on, for example, the same substrate as the OLED driving circuit 245. With this configuration, the temperature sensor 239 mainly detects the temperature of the OLED panel 243. The temperature sensor 239 may be incorporated in the OLED panel 243 or the OLED driving circuit 245. Details of the temperature sensor 239 are the same as the details of the temperature sensor 217.

The camera 61, the illuminance sensor 65, and the temperature sensor 217 of the right display unit 22 and the six-axis sensor 235, the magnetic sensor 237, and the temperature sensor 239 of the left display unit 24 are connected to the sensor hub 192 of the control device 10. The sensor hub 192 performs setting and initialization of sampling cycles of the sensors according to the control by the main processor 140. The sensor hub 192 executes energization to the sensors, transmission of control data, acquisition of detection values, and the like according to the sampling cycles of the sensors. The sensor hub 192 outputs detection values of the sensors included in the right display unit 22 and the left display unit 24 to the main processor 140 at preset timing. The sensor hub 192 may include a cache function of temporarily retaining the detection values of the sensors. The sensor hub 192 may include a conversion function for a signal format and a data format of the detection values of the sensors (e.g., a conversion function into a unified format). The sensor hub 192 starts and stops energization to the LED indicator 67 according to the control by the main processor 140 to light or extinguish the LED indicator 67.

Figure 6:
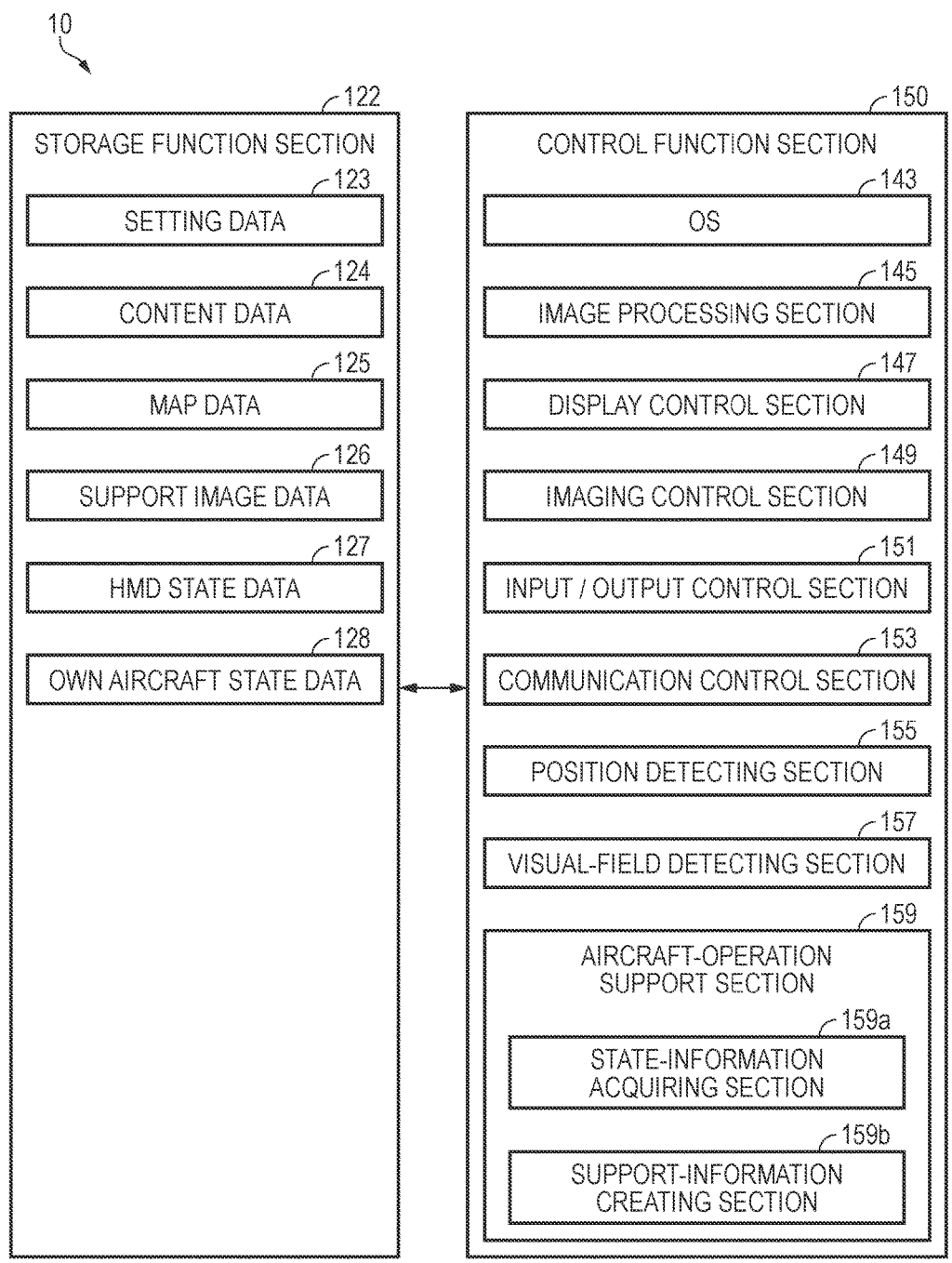
FIG. 6 is a block diagram functionally showing the configuration of a control device.

FIG. 6 is a block diagram functionally showing the configuration of the control device 10. The control device 10 functionally includes a storage function section 122 and the control function section 150. The storage function section 122 is a logical storing section configured by the nonvolatile storing section 121 (FIG. 5). As the storage function section 122, instead of a configuration in which only the storage function section 122 is used, a configuration may be adopted in which the EEPROM 215 and the memory 118 are used in combination with the nonvolatile storing section 121. The main processor 140 executes a computer program, that is, hardware and software cooperate, whereby the control function section 150 is configured. Note that that control function section 150 is equivalent to a "control section".

Various data served for processing in the control function section 150 are stored in the storage function section 122. Specifically, setting data 123, content data 124, map data 125, support image data 126, HMD state data 127, own aircraft state data 128 are stored in the storage function section 122 in this embodiment. The setting data 123 includes various setting values related to the operation of the HMD 100. For example, the setting data 123 includes parameters, a determinant, an arithmetic expression, an LUT (Look UP Table), and the like at the time when the control function section 150 controls the HMD 100.

The content data 124 includes data (image data, video data, sound data, etc.) of contents including images and videos displayed by the image display section 20 according to the control by the control function section 150. The content data 124 includes, for example, operation support image data prepared in advance for operation support explained below. Note that the content data 124 may include data of bidirectional contents. The bidirectional contents mean contents of a type displayed on the image display section 20 according to content of processing executed by the control function section 150 according to content of operation by the user acquired by the operation section 110. In this case, the data of the contents could include image data of a menu screen for acquiring operation of the user and data for deciding processing corresponding to items included in the menu screen.

The map data 125 includes map data used for grasping a position where the unmanned aircraft (hereinafter referred to as "own aircraft" as well) 400 set as an operation target object of the user is flying. The HMD state data 127 includes coordinate data of a present position of the user specified by the position detecting section and data of a visual field specified by the visual-field detecting section. The own-aircraft state data 128 includes state data of the own aircraft 400 explained below.

The control function section 150 executes various kinds of processing using the data stored by the storage function section 122 to thereby execute functions of the OS 143, an image processing section 145, a display control section 147, an imaging control section 149, an input/output control section 151, a communication control section 153, a position detecting section 155, a visual-field detecting section 157, and an aircraft-operation support section 159. In this embodiment, the functional sections other than the OS 143 are configured as computer programs executed on the OS 143.

The image processing section 145 generates, on the basis of image data of an image or a video displayed by the image display section 20, signals transmitted to the right display unit 22 and the left display unit 24. The signals generated by the image processing section 145 may be a vertical synchronization signal, a horizontal synchronization signal, a clock signal, an analog image signal, and the like. Besides being realized by the main processor 140 executing the computer program, the image processing section 145 may be configured by hardware (e.g., a DSP (Digital Signal Processor)) separate from the main processor 140.

Note that the image processing section 145 may execute resolution conversion processing, image adjustment processing, 2D/3D conversion processing, and the like according to necessity. The resolution conversion processing is processing for converting resolution of image data into resolution suitable for the right display unit 22 and the left display unit 24. The image adjustment processing is processing for adjusting luminance and chroma of the image data. The 2D/3D conversion processing is processing for generating two-dimensional image data from three-dimensional image data or generating three-dimensional image data from two-dimensional image data. When executing these kinds of processing, the image processing section 145 generates a signal for displaying an image on the basis of the image data after the processing and transmits the signal to the image display section 20 via the connection cable 40.

The display control section 147 generates a control signal for controlling the right display unit 22 and the left display unit 24 and controls, with the control signal, generation and emission of image lights by the right display unit 22 and the left display unit 24. Specifically, the display control section 147 controls the OLED driving circuits 225 and 245 to cause the OLED panels 223 and 243 to execute display of images. The display control section 147 performs, on the basis of signals output by the image processing section 145, control of timing when the OLED driving circuits 225 and 245 perform drawing on the OLED panels 223 and 243 and control of the luminance of the OLED panels 223 and 243.

The imaging control section 149 controls the camera 61 to execute imaging, generates captured image data, and causes the storage function section 122 to temporarily store the captured image data. When the camera 61 is configured as a camera unit including a circuit that generates captured image data, the imaging control section 149 acquires the captured image data from the camera 61 and causes the storage function section 122 to temporarily store the captured image data.

The input/output control section 151 controls the touch pad 14 (FIG. 1), the direction key 16, and the determination key 17 as appropriate and acquires input commands from the touch pad 14, the direction key 16, and the determination key 17. The acquired commands are output to the OS 143 or a computer program operating on the OS 143 together with the OS 143. The communication control section 153 controls the wireless communication section 117 to perform wireless communication between the communication control section 153 and the remote control device 500.

The position detecting section 155 acquires, at any time, a coordinate of a present position of the user wearing the HMD 100 from the GPS receiver 115 and includes and stores data of the acquired present position in the HMD state data 127 of the storage function section 122. The visual-field detecting section 157 specifies a visual field of the user from a movement of the head detected at any time by the six-axis sensor 235 and the magnetic sensor 237 and includes and stores data of the specified visual field in the HMD state data 127.

The aircraft-operation support section 159 includes a function of acquiring state information concerning a state of the aircraft such as the position, the altitude, the speed, and the moving direction of the own aircraft 400 from the remote control device 500 in cooperation with the communication control section 153 and a function of creating, according to the acquired state information (state data) of the own aircraft 400, a support image including support information for supporting the operation of the own aircraft 400 and causing the image display section 20 to display the support image. The former function of acquiring the state information of the own aircraft 400 is realized by a state-information acquiring section 159a. The latter function of setting the support image indicating the support information is realized by a support-information creating section 159b.

Figure 7:
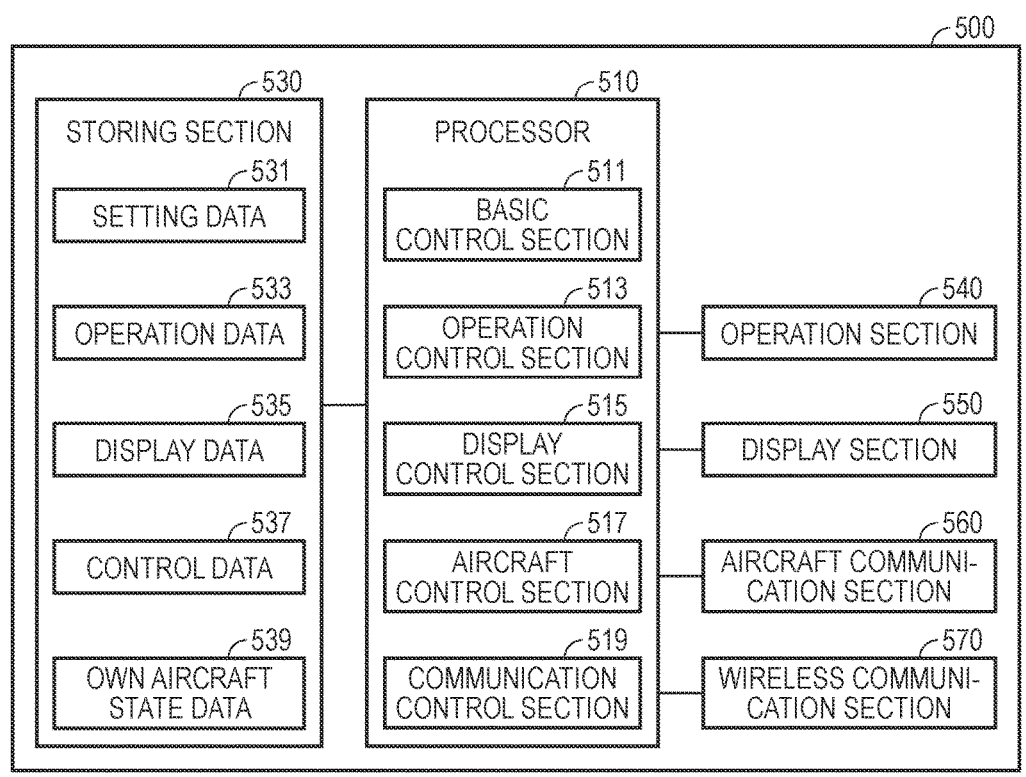
FIG. 7 is a block diagram functionally showing the configuration of a remote control device.

FIG. 7 is a block diagram functionally showing the configuration of the remote control device 500. The remote control device 500 includes a processor 510, a storing section 530, an operation section 540, a display section 550, an aircraft communication section 560, and a wireless communication section 570. The storing section 530, the operation section 540, the display section 550, the aircraft communication section 560, and the wireless communication section 570 are connected to the processor 510.

The processor 510 executes computer programs stored in a not-shown memory to thereby function as a basic control section 511, an operation control section 513, a display control section 515, an aircraft control section 517, and a communication control section 519.

The basis control section 511 is a function control section that controls a basic operation of the remote control device 500. The operation control section 513 is a function control section that controls an input/output operation by the operation section 540 including a not-shown input/output section. The display control section 515 is a function control section that controls a display operation by the display section 550 including a not-shown display device. State information and control information of the own aircraft 400 are displayed on the display section 550. The aircraft control section 517 is a function control section that performs wireless communication between the aircraft control section 517 and the own aircraft 400 via the aircraft communication section 560 and controls the operation of the own aircraft 400. The aircraft control section 517 transmits control data corresponding to an operation instruction input by the user via the operation section 540 to the own aircraft 400 via the aircraft communication section 560 and controls flight of the own aircraft 400. The aircraft control section 517 is also capable of controlling the flight of the own aircraft 400 according to flight control data programmed and stored in the storing section 530. The aircraft control section 517 is also capable of causing the own aircraft 400 to store a flight program in advance, causing the own aircraft 400 to autonomously fly, and monitoring a flying state of the own aircraft 400. The aircraft communication section 560 performs, for example, wireless communication by a radio wave for radio control. The communication control section 519 performs wireless communication between the communication control section 519 and the control device 10 of the HMD 100 via the wireless communication section 570. The wireless communication section 570 performs wireless communication conforming to standards such as Bluetooth (registered trademark) and a wireless LAN including Wi-Fi (registered trademark). Note that a path of the wireless communication executed between the wireless communication section 117 (FIG. 5) of the control device 10 and the wireless communication section 570 of the remote control device 500 is equivalent to a "wireless communication path" in this embodiment.

In the storing section 530, basic setting data 531 of the control sections 511, 513, 515, 517, and 519, operation data 533 used in the operation control section 513, display data 535 used in the display control section 515, and control data 537 used in the aircraft control section 517 are stored. Own aircraft state data 539 of the own aircraft 400 sent at any time via the aircraft communication section 560 is also stored in the storing section 530.

Although illustration and detailed explanation are omitted, the unmanned aircraft 400 controlled by the remote control device 500 is an unmanned aerial vehicle capable of flying according to remote piloting from the remote control device 500. The unmanned aircraft 400 is an unmanned aerial vehicle capable of performing autonomous flight according to flight control data stored in advance in a storing section mounted on the unmanned aerial vehicle. The unmanned aircraft 400 is mounted with various sensors such as a GPS sensor (a GPS receiver), an altitude sensor, an IMU sensor, and an image sensor. The unmanned aircraft 400 transmits, at any time, information corresponding to the mounted sensors such as a present position, altitude, speed, a moving direction, a posture, and an aerially photographed image to the remote control device 500 by wireless communication.

A2. Operation Support Processing

In the following explanation, first, state information acquisition processing from the own aircraft 400 executed in the remote control device 500 is explained. Thereafter, aircraft operation support processing in the HMD 100 is explained.

Figure 8:
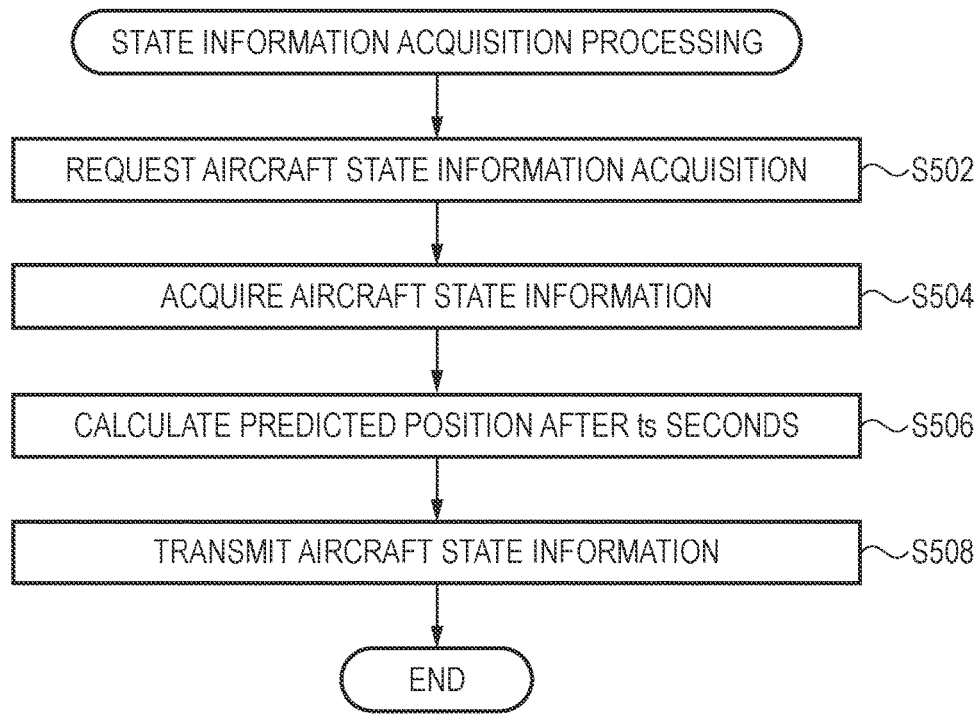
FIG. 8 is a flowchart for explaining state information acquisition processing in the remote control device.

FIG. 8 is a flowchart for explaining the state information acquisition processing in the remote control device 500. The state information acquisition processing is a kind of processing executed by the aircraft control section 517 (FIG. 7) and is periodically repeatedly executed. First, the aircraft control section 517 requests a target aircraft (the own aircraft 400) to acquire aircraft state information (step S502) and acquires aircraft state information returned from the own aircraft 400 (step S504). The acquired aircraft state information is stored in the storing section 530 as the own aircraft state data 539. The aircraft state information includes information such as a present position, altitude, speed, a moving direction, a posture, and remaining battery power. The aircraft control section 517 calculates a predicted position after ts seconds (hereinafter sometimes simply referred to as "predicted position") from the obtained information such as the present position, the altitude, the speed, and the moving direction (step S506). Data of the calculated predicted position is included in the own aircraft state data 539. The aircraft control section 517 transmits the own aircraft state information (the aircraft state information) represented by the own aircraft state data 539 to the control device 10 of the HMD 100 by wireless communication (step S508). In this way, the aircraft state information (the own aircraft state information) periodically acquired from the own aircraft 400 is transmitted from the remote control device 500 to the control device 10 of the HMD 100. Note that a value of ts seconds can be set to any value in advance. Usually, the value of ts seconds is desirably set to an interval of the periodically-repeated transmission of the aircraft state information between the own aircraft 400 and the remote control device 500. Consequently, it is possible to easily correct deviation between the predicted position and an actual position and improve accuracy of support information explained below.

Figure 9:
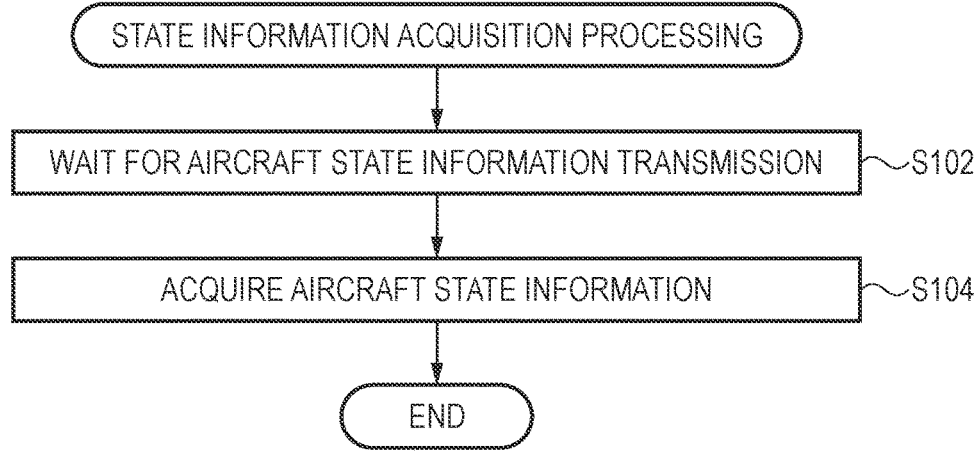
FIG. 9 is a flowchart for explaining the state information acquisition processing in aircraft operation support processing.
Figure 10:
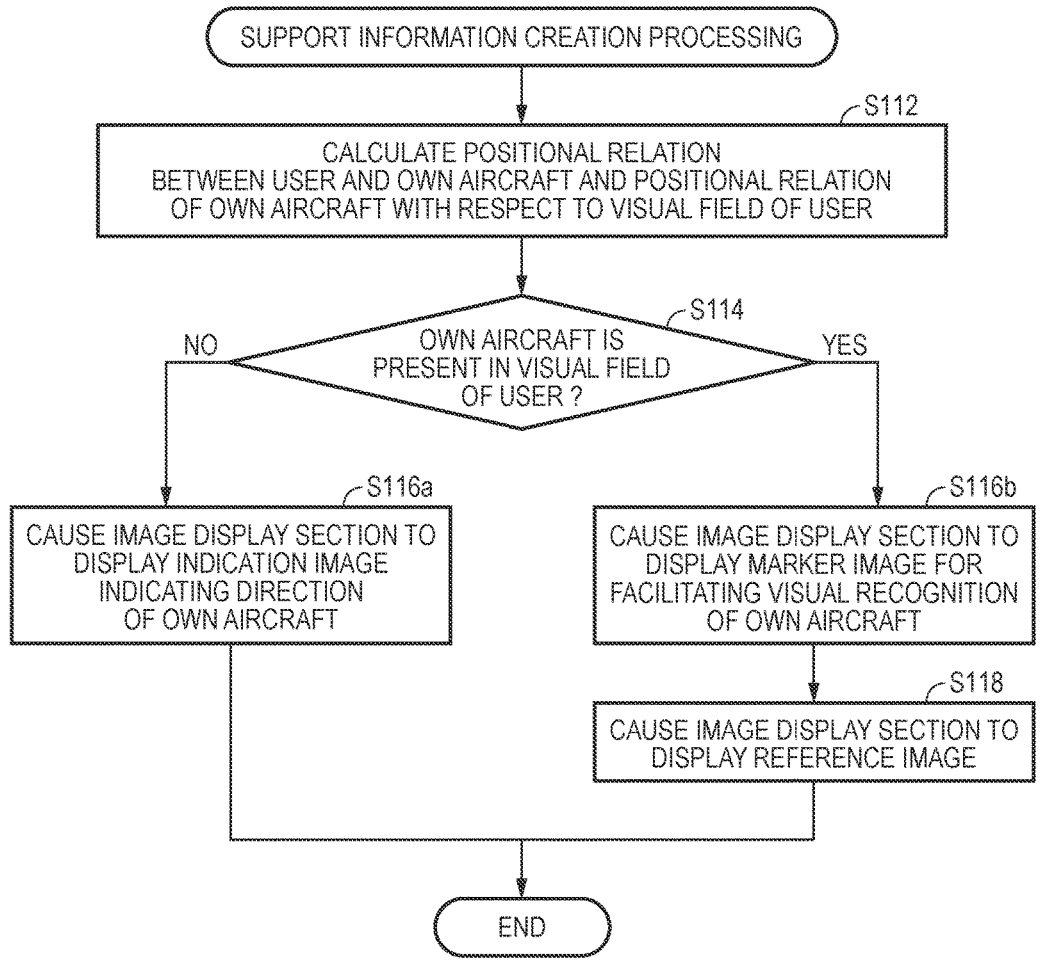
FIG. 10 is a flowchart showing support information creation processing in the aircraft operation support processing.

FIG. 9 is a flowchart for explaining the state information acquisition processing in the aircraft operation support processing in the HMD 100. FIG. 10 is a flowchart for explaining the support information creation processing in the aircraft operation support processing in the HMD 100. The aircraft operation support processing executed in the HMD 100 corresponds to the aircraft-operation support section 159 of the control function section 150 (FIG. 6). The state information acquisition processing corresponds to the state-information acquiring section 159a included in the aircraft-operation support section 159. The support information creation processing corresponds to the support-information creating section 159b. As explained above, the aircraft-operation support section 159 is the control section that functions when the computer program (an application program) for operation support stored in the nonvolatile storing section 121 (FIG. 5) is executed by the main processor 140 of the HMD 100. For example, the execution is started when an icon of "aircraft operation support" is indicated by the direction key 16 (FIG. 1) and the determination key 17 (FIG. 1) out of a menu screen (not shown in the figure) displayed to be superimposed on an outside scene in the image display section 20. Consequently, pairing of the HMD 100 with the remote control device 500 and the unmanned aircraft (the own aircraft) 400 set as the operation target is executed. The state information acquisition processing by the state-information acquiring section 159a and the support information creation processing by the support-information creating section 159b are repeatedly executed until the processing by the aircraft-operation support section 159 ends according to an end sequence.

As shown in FIG. 9, when starting the state information acquisition processing, the state-information acquiring section 159a waits for transmission of aircraft state information from the remote control device 500 (step S102) and acquires aircraft state information transmitted from the remote control device 500 (step S104). The acquired aircraft state information (own aircraft state information) is stored in the storage function section 122 as the own aircraft state data 128 (FIG. 6).

As shown in FIG. 10, when starting the support information creation processing, the support-information creating section 159b calculates a positional relation between the user and the own aircraft 400 and calculates a positional relation of the own aircraft 400 with respect to the visual field of the user from the data of the position and the visual field of the user included in the HMD state data 127 and the data of the position of the own aircraft 400 included in the own aircraft state data 128 (step S112). The positional relation of the own aircraft 400 with respect to the visual field means a position of the own aircraft 400 with respect to the visual field.

When determining from the positional relation of the own aircraft 400 with respect to the visual field of the user that the own aircraft 400 is absent in an outside scene corresponding to the visual field of the user (No in step S114), the support-information creating section 159b creates an indication image indicating the direction of the own aircraft 400 as a support image and causes the image display section 20 to superimpose and display the indication image serving as an AR image on the outside scene (step S116a).

Figure 11:
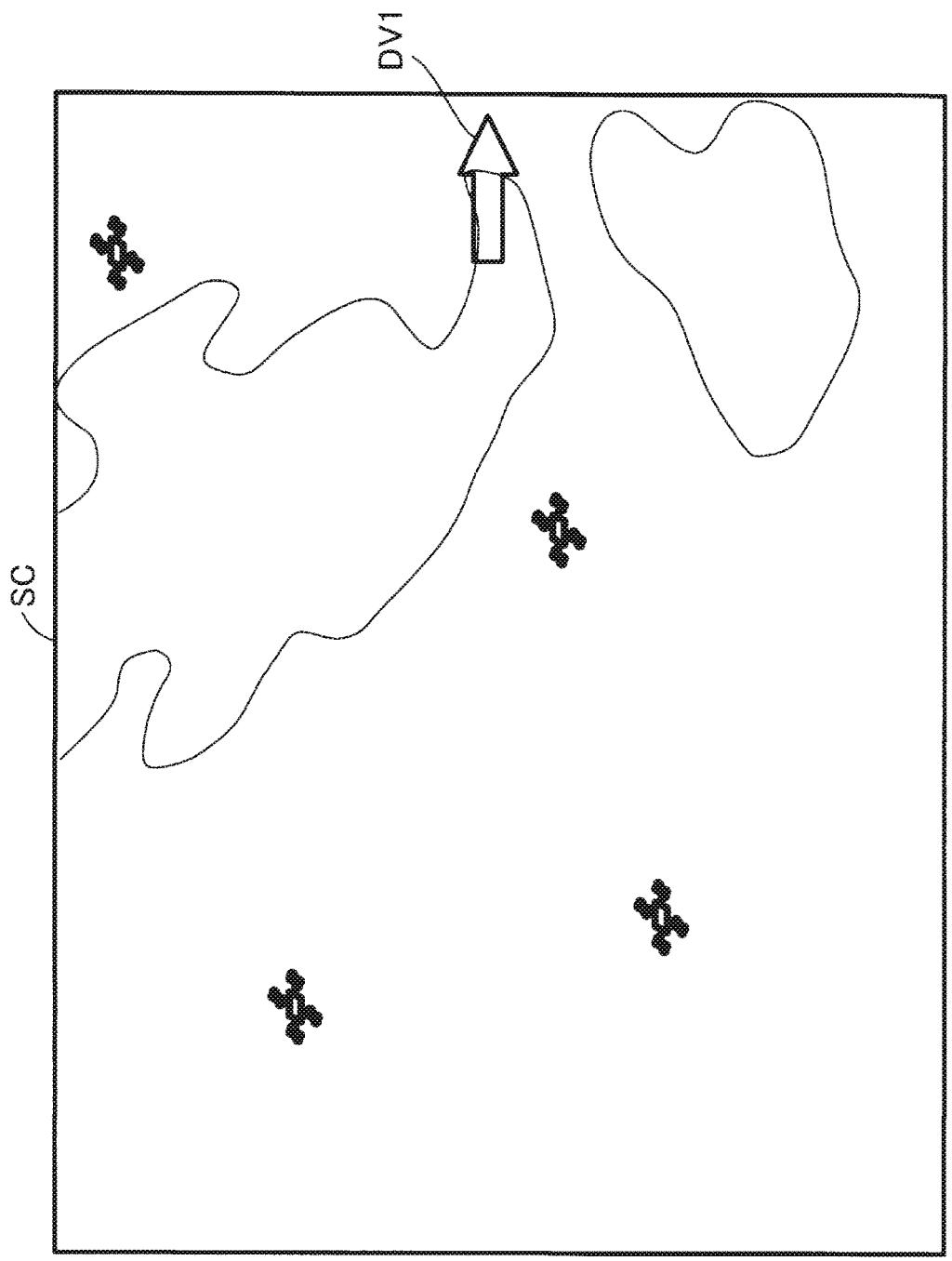
FIG. 11 is an explanatory diagram showing an example of display of an indication image.

FIG. 11 is an explanatory diagram showing an example of the display of the indication image. FIG. 11 shows a state in which an indication image DV1 indicating that the own aircraft 400 is present further in the right direction than the visual field of the user is superimposed and displayed on an outside scene SC corresponding to the visual field of the user. The user can allow the own aircraft 400 to easily enter the visual field of the user by turning to the right direction according to the indication image DV1. That is, if the user changes the direction of the head wearing the image display section 20 according to the indication image superimposed and displayed on the outside scene corresponding to the visual field of the user, the user can easily capture the own aircraft 400 within the visual field of the user.

On the other hand, when determining that the own aircraft 400 is present in the outside scene corresponding to the visual field of the user (Yes in step S114 in FIG. 10), the support-information creating section 159b creates a marker image for facilitating distinction of the own aircraft 400 as a support image and causes the image display section 20 to superimpose and display the marker image serving as an AR image on the outside scene (step S116b). The support-information creating section 159b creates a reference image as the support image on the basis of state information of the own aircraft and causes the image display section 20 to superimpose and display the reference image serving as an AR image on the outside scene (step S118). Note that step S118 may be omitted.

Figure 12:
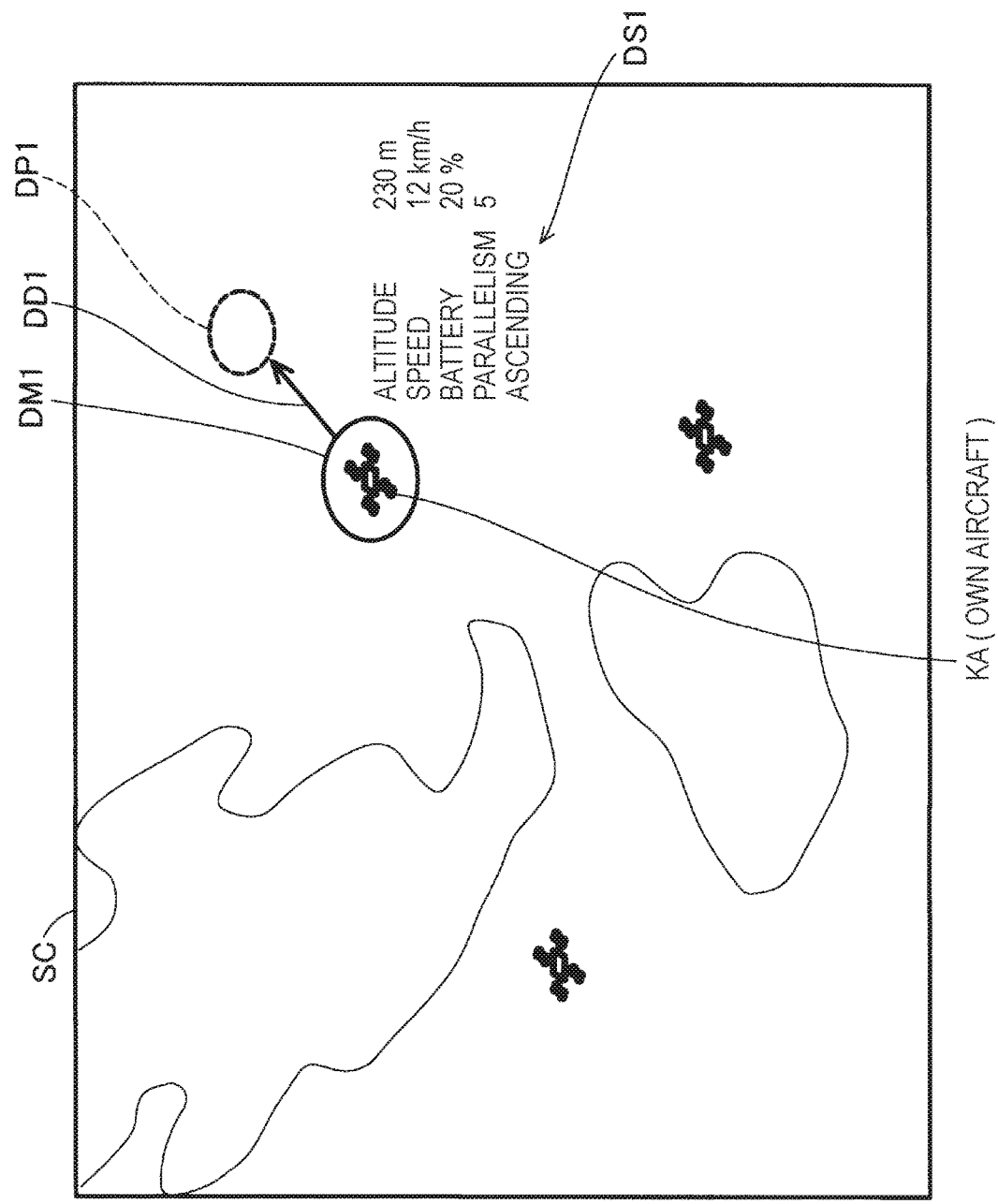
FIG. 12 is an explanatory diagram showing an example of display of a marker image and reference images.

FIG. 12 is an explanatory diagram showing an example of display of a marker image and reference images. FIG. 12 shows a state in which a marker image DM1 having an elliptical frame shape surrounding the own aircraft 400 (KA) in the outside scene SC with a solid line and a reference information image DS1 indicating state information of the own aircraft KA, a moving direction image DD1, which is moving direction information indicating a moving direction of the own aircraft KA, and a predicted position image DP1 having an elliptical frame shape of a broken line indicating a predicted position after is seconds serving as reference images are superimposed and displayed. Note that, as the reference information image DS1 in this example, altitude, speed, residual battery power, parallelism of the aircraft, and information indicating whether the aircraft is ascending are shown as examples. The size of the predicted position image DP1 desirably changes according to a positional relation between a present position of the user and the own aircraft KA. Consequently, it is possible to cause the user to easily visually grasp according to the size of the predicted position image whether the own aircraft KA is separating from or approaching the user. The user is capable of easily distinguishing the position of the own aircraft KA with the marker image DM1. The user can easily grasp, with information included in the reference information image DS1, a state of the own aircraft KA without taking the user's eyes off the own aircraft KA. The user can visually easily grasp a moving direction of the own aircraft KA with the moving direction image DD1. The user can visually easily grasp a predicted position after is seconds of the own aircraft KA with the predicted position image DP1. That is, the user is capable of easily distinguishing the own aircraft with the marker image and capable of easily grasping a state of the own aircraft with reference information indicated by the reference images. Consequently, it is possible to improve operability of the user.

Note that, although the altitude, the speed, the remaining battery power, the parallelism of the aircraft, and the information indicating that the aircraft is ascending are shown as the reference information image DS1, information displayed as the reference information image is not limited to these kinds of information. Various kinds of information contributing to support of operation may be included as appropriate according to acquired aircraft state information. For example, radio wave intensity of wireless communication may be included in the acquired aircraft state information. Information such as the radio wave intensity of the wireless communication, a remote operation possible region, and a remote operation possible distance may be displayed as the reference information image. An image showing the remote operation possible region may be displayed as a kind of a reference image.

Figure 13:
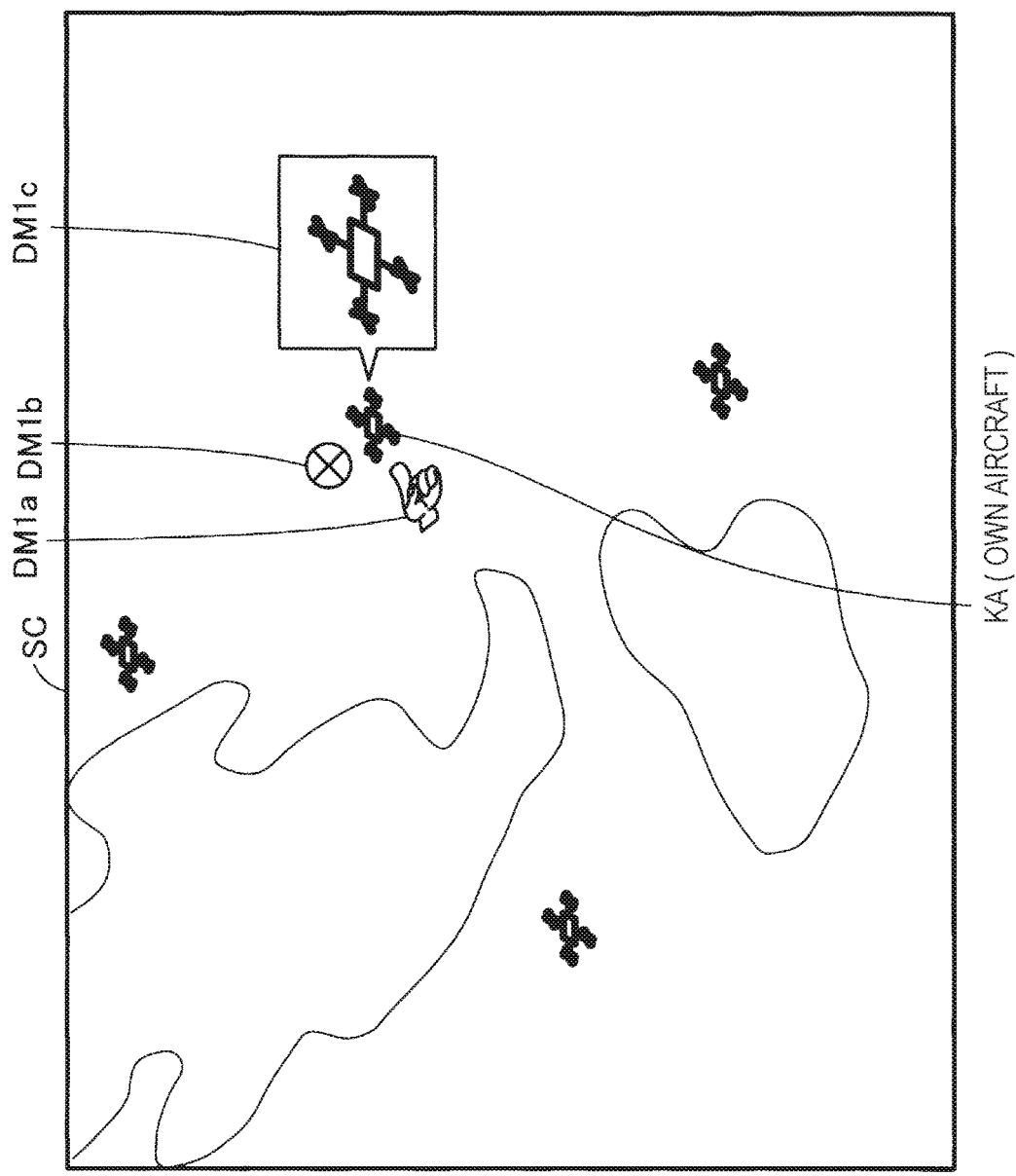
FIG. 13 is an explanatory diagram showing a modification of the marker image of an own aircraft.

FIG. 13 is an explanatory diagram showing a modification of the marker image of the own aircraft. The marker image DM1 shown in FIG. 12 is the image having the elliptical frame shape surrounding the own aircraft 400 (KA). However, the marker image is not limited to this. The marker image may be images having various shapes such as marker images DM1a and DM1b shown in FIG. 13. The marker image may be an enlarged image like a marker image DM1c shown in FIG. 13. That is, the marker image is not particularly limited as long as the marker image has a shape capable of easily distinguishing the own aircraft.

A plurality of marker images may be included in the support image data 126 (FIG. 6) and prepared in advance to enable the user to select an easily distinguishable preferred marker image out of the plurality of marker images. Further, not only the shapes but also various colors and line shapes (a solid line, a broken line, thickness, etc.) may be able to be selected in order to improve distinctiveness of the user. The marker image may be flashed in order to improve distinctiveness at night. The marker image may be automatically adjusted according to, for example, a color of an outside scene in order to secure distinctiveness from an outside scene (the sky, clouds, scenery, etc.) The automatic adjustment can be executed by, for example, performing an image analysis of a captured image by the camera 61 to thereby distinguish a color of the outside scene in a position where the own aircraft 400 is present. It is possible to improve distinctiveness of the own aircraft 400 by performing, as explained above, dimming for the sunlight with the dimming plate provided on the surfaces of the right light guide plate 26 and the left light guide plate 28 (FIG. 2).

Similarly, as the moving direction image DD1 shown in FIG. 12, an arrow indicating a direction is shown as an example. However, the moving direction image is not limited to this. For example, various additional images showing a moving direction such as a flight track image like a condensation trail or a shadow added behind the aircraft may be used as the moving direction image. As the moving direction image, like the marker image, a plurality of moving direction images may be prepared in advance to enable the user to select an easily distinguishable moving direction image.

Figure 14:
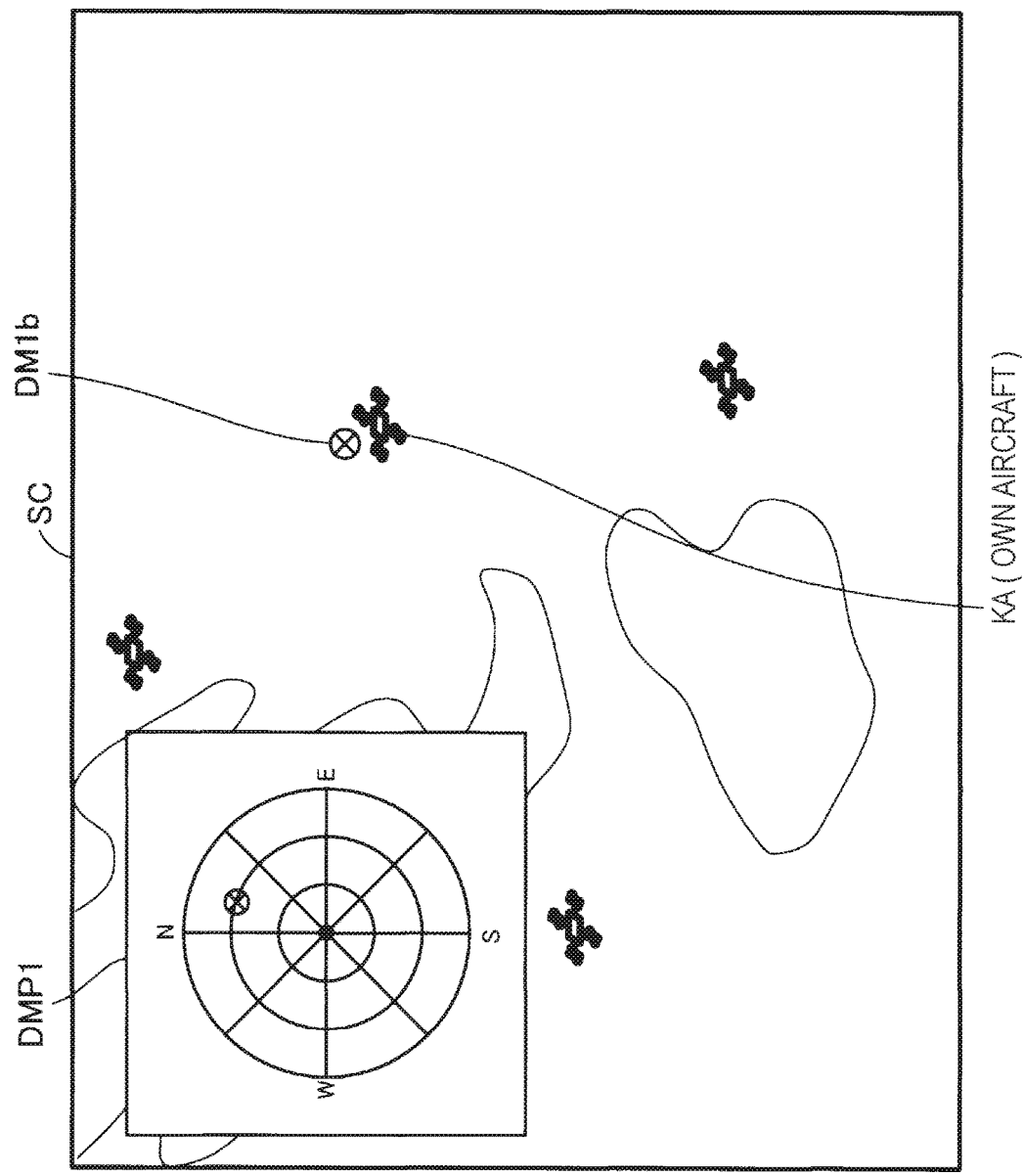
FIG. 14 is an explanatory diagram showing a modification in which a map image is displayed as a support image.

FIG. 14 is an explanatory diagram showing a modification in which a map image is displayed as a support image. In order to grasp a planar positional relation from the position of the user who operates the own aircraft 400 (KA), as shown in FIG. 14, a map image DMP1 may be displayed to be superimposed on the outside scene SC. The map image DMP1 is an example in which a positional relation between the position of the user and the position of the own aircraft KA by the marker image DM1b is shown using a concentric circle map centering on the position of the user. A positional relation between the user and the own aircraft KA can be easily grasped with the map image DMP1. Therefore, it is possible to improve operability of the user.

Note that the support image displayed to be superimposed on the outside scene is not limited to the marker image and the reference images explained with reference to FIGS. 12 to 14. Images representing various kinds of information useful for support of operation of the own aircraft may be applied as the support image.

Although illustration and detailed explanation are omitted, a captured image captured by an image sensor (a camera) mounted on the own aircraft 400 may be acquired from the remote control device 500 and superimposed and displayed on an outside scene as a reference image.

Note that, like the reference information image DS1 (FIG. 12), which is the state explanation information of the own aircraft 400, an image indicating information displayed as a text is desirably a two-dimensional (2D) image. Like the indication image DV1 (FIG. 11), the moving direction image DD1 (FIG. 12), and the predicted position image DP1, an image indicating information changing according to the position of the own aircraft 400 is desirably a three-dimensional image applied with transmittance adjustment and parallactic angle adjustment. A state of 3D, for example, a parallactic angle may be changed according to a change in a state (a position, speed, a moving direction, etc.) of the own aircraft 400. If the image is the 3D image, it is possible to improve a sense of reality and a sense of presence. It is possible to achieve improvement of operability of remote operation. Luminaces, colors, transmittances, and the like of the support images superimposed and displayed on an outside scene may be automatically controlled or manually adjusted according to brightness of the outside scene or a state of the outside scene, on which the support images are superimposed, to improve visibility of the support images. Consequently, it is possible to achieve improvement of operability of remote operation. 2D and 3D may be able to be switched for each of the support images.

B. Second Embodiment

B1. Configuration of an Operation Support System

Figure 15:
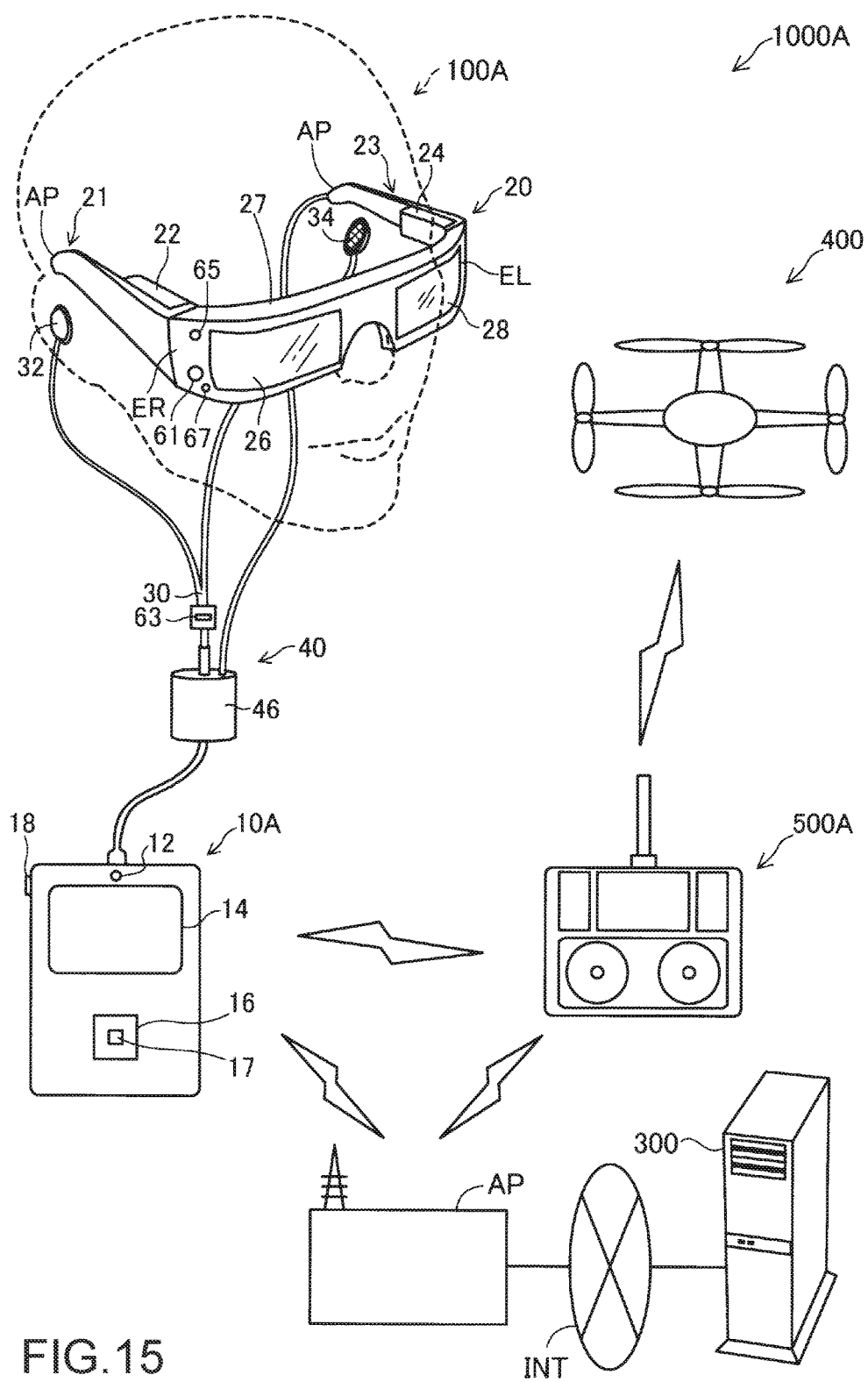
FIG. 15 is an explanatory diagram showing a schematic configuration of an operation support system in a second embodiment.

FIG. 15 is an explanatory diagram showing a schematic configuration of an operation support system in a second embodiment of the invention. An operation support system 1000A includes a head-mounted display device (HMD) 100A, the unmanned aircraft (an own aircraft) 400, a remote control device 500A, and a management server 300. The HMD 100A and the remote control device 500A are connected to the Internet INT via an access point AP connected by wireless communication. As a result, the HMD 100A and the remote control device 500A are connected to each other by the management server 300 and the Internet INT.

In the HMD 100A, the control device 10 of the HMD 100 (FIG. 1) is replaced with a control device 10A. The HMD 100A is the same as the HMD 100 except that a functional configuration of the control device 10A is different from the functional configuration (FIG. 6) of the control device 10.

Figure 16:
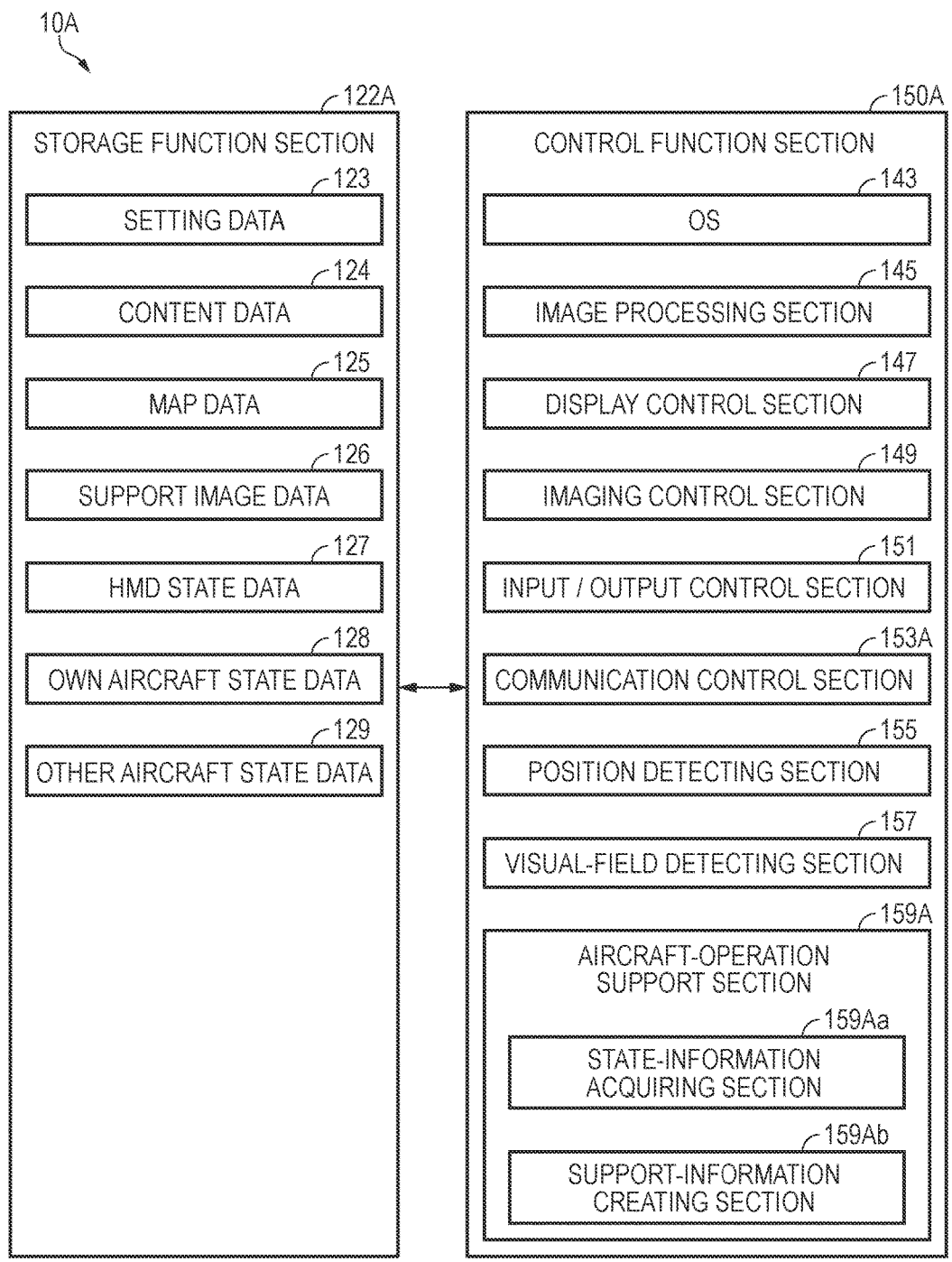
FIG. 16 is a block diagram functionally showing the configuration of a control device.

FIG. 16 is a block diagram functionally showing the configuration of the control device 10A. In the control device 10A, the control function section 150 and the storage function section 122 of the control device 10 (FIG. 6) are replaced with a control function section 150A and a storage function section 122A. In the storage function section 122A, other aircraft state data 129 explained below are stored in addition to the various data 123 to 128 stored in the storage function section 122.

In the control function section 150A, the communication control section 153 of the control function section 150 is replaced with a communication control section 153A. The aircraft-operation support section 159 including the state-information acquiring section 159a and the support-information creating section 159b is replaced with an aircraft-operation support section 159A including a state-information acquiring section 159Aa and a support-information creating section 159Ab.

The communication control section 153A controls the wireless communication section 117 to perform wireless communication not only between the communication control section 153A and the remote control device 500A but also between the communication control section 153A and the access point AP.

As explained below, the aircraft-operation support section 159A cooperates with the communication control section 153 to acquire, from the management server 300, state information of the own aircraft 400 and state information of other aircrafts present around the own aircraft 400 with the state-information acquiring section 159Aa. The aircraft-operation support section 159A sets a support image with the support-information creating section 159Ab using the state information of the own aircraft and the state information of the other aircrafts.

Figure 17:
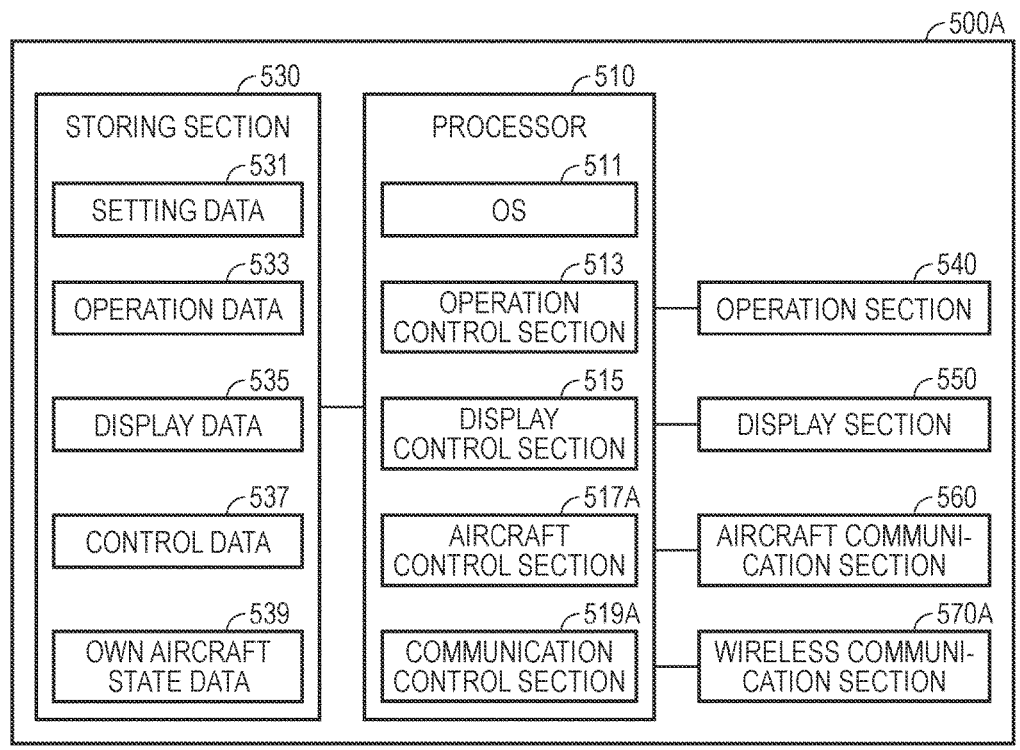
FIG. 17 is a block diagram functionally showing the configuration of a remote control device.

FIG. 17 is a block diagram functionally showing the configuration of the remote control device 500A. In the remote control device 500A, the aircraft control section 517 and the communication control section 519 of the remote control device 500 (FIG. 7) are replaced with an aircraft control section 517A and a communication control section 519A.

In addition to the wireless communication performed by the communication control section 519 of the remote control device 500 between the communication control section 519 and the control device 10 of the HMD 100 via the wireless communication section 570, the communication control section 519A performs wireless communication between the communication control section 519A and the access point AP.

In step S508 of the state information acquisition processing shown in FIG. 8, the aircraft control section 517 (FIG. 7) of the remote control device 500 transmits the state information of the own aircraft 400 acquired from the own aircraft 400 to the control device 10 of the HMD 100. On the other hand, the aircraft control section 517A transmits acquired state information of the own aircraft 400 to the management server 300 in cooperation with the communication control section 519A. Note that, in addition to the transmission to the management server 300, the aircraft control section 517A may transmit the state information to the control device 10A of the HMD 100A.

Figures 18, 19:
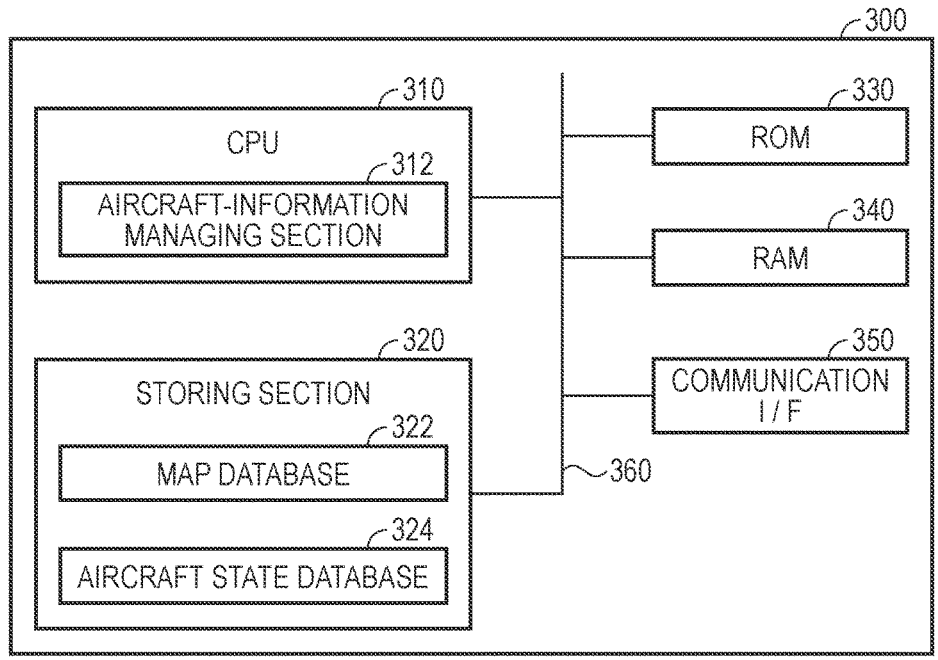
FIG. 18 is a block diagram functionally showing the configuration of a management server.
FIG. 19 is an explanatory diagram showing an example of an aircraft state database.

FIG. 18 is a block diagram functionally showing the configuration of the management server 300. The management server 300 includes a CPU 310, a storing section 320, a ROM 330, a RAM 340, and a communication interface (I/F) 350. The sections are connected to one another by a bus 360.

The CPU 310 develops, in the RAM 340, computer programs stored in the storing section 320 and the ROM 330 and executes the computer programs to thereby control the sections of the management server 300. Besides, the CPU 310 functions as an aircraft-information managing section 312 as well. The aircraft-information managing section 312 acquires state information of aircrafts sent at any time (usually, periodically) from remote control devices corresponding to unmanned aircrafts registered in advance and stores the state information in the storing section 320 as an aircraft state database 324 and manages the state information.

FIG. 19 is an explanatory diagram showing an example of the aircraft state database 324. As shown in FIG. 19, in the aircraft state database 324, concerning aircraft IDs registered in advance, transmitted information such as a present position, altitude, speed, a direction, and a predicted position after ts seconds, information that should be notified, and information concerning an information transmission destination are stored. Note that, for example, as explained above, the transmission destination information of the aircrafts only has to be transmitted while being included in transmission of state information from the remote control device 500A to the management server 300 when the HMD 100A and the unmanned aircraft 400 and the remote control device 500A corresponding to the HMD 100A are paired. However, the transmission destination information is not limited to this. The transmission destination information may be registered in advance or may be transmitted from the HMD 100 to the management server 300 after the pairing. If the paired HMD 100A is registered as a transmission destination of the estate information, a method of transmission of the state information is not particularly limited.

The aircraft-information managing section 312 transmits state information of the own aircraft and state information of the other aircrafts to the control device 10A of the HMD 100A paired with the aircrafts. As the other aircrafts, the state information of which is transmitted, for example, aircrafts present in a space in a range decided in advance are selected. Note that, when an aircraft satisfying a first approach condition decided in advance is present among the other aircrafts, the state information is transmitted, as shown in FIG. 19, information indicating that another approaching aircraft is present is set in state information of the own aircraft and the other aircrafts as information that should be notified. The first approach condition is that, for example, an aircraft is present within a range of a radius decided in advance with respect to the own aircraft and that a predicted position after ts seconds is within the range of the radius decided in advance with respect to the own aircraft. However, the first approach condition is not limited to this. Any condition can be set taking into account an approach degree determined from a present positional relation between the own aircraft and the other aircrafts calculated from a relation between a position, altitude, speed, and a moving direction of the own aircraft and positions, altitudes, speeds, and moving directions of the other aircrafts and a positional relation of predicted positions after ts seconds of the own aircraft and the other aircrafts.

The storing section 320 is configured by a ROM, a RAM, a DRAM, a hard disk, or the like. In the storing section 320, various computer programs such as an operating system (OS) are stored. In the storing section 320, a map database 322 and the aircraft state database 324 explained above are stored.

The communication interface (I/F) 350 performs wireless communication between the communication interface (I/F) 350 and a wireless communication section 570A (FIG. 17) of the remote control device 500A and the wireless communication section 117 (FIG. 5) of the control device 10A by the Internet INT and the access point AP. Note that a path of the wireless communication performed among the wireless communication section 117 of the control device 10A, the wireless communication section 570A of the remote control device 500A, and the access point AP is equivalent to the "wireless communication path" in this embodiment.

B2. Operation Support Processing

Figure 20:
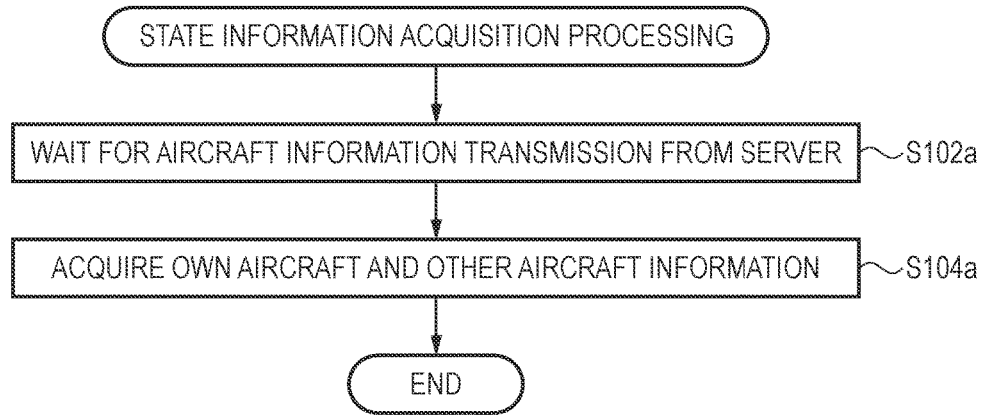
FIG. 20 is a flowchart for explaining state information acquisition processing by a state-information acquiring section.

FIG. 20 is a flowchart for explaining the state information acquisition processing by the state-information acquiring section 159Aa. When starting the state information acquisition processing, the state-information acquiring section 159Aa waits for transmission of aircraft state information from the management server 300 (FIG. 18) (step S102*a*) and acquires aircraft state information transmitted from the management server 300 (step S104*a*). The acquired aircraft state information is stored in the storage function section 122 (FIG. 16) as the own aircraft state data 128 and the other aircraft state data 129. In this example, as the aircraft state information, as shown in FIG. 19, information such as a present position, altitude, speed, direction, a predicted position, and notification is acquired. As explained below, the information is used for creation and display of a marker image and a reference image serving as a support image indicating support information.

Figure 21:
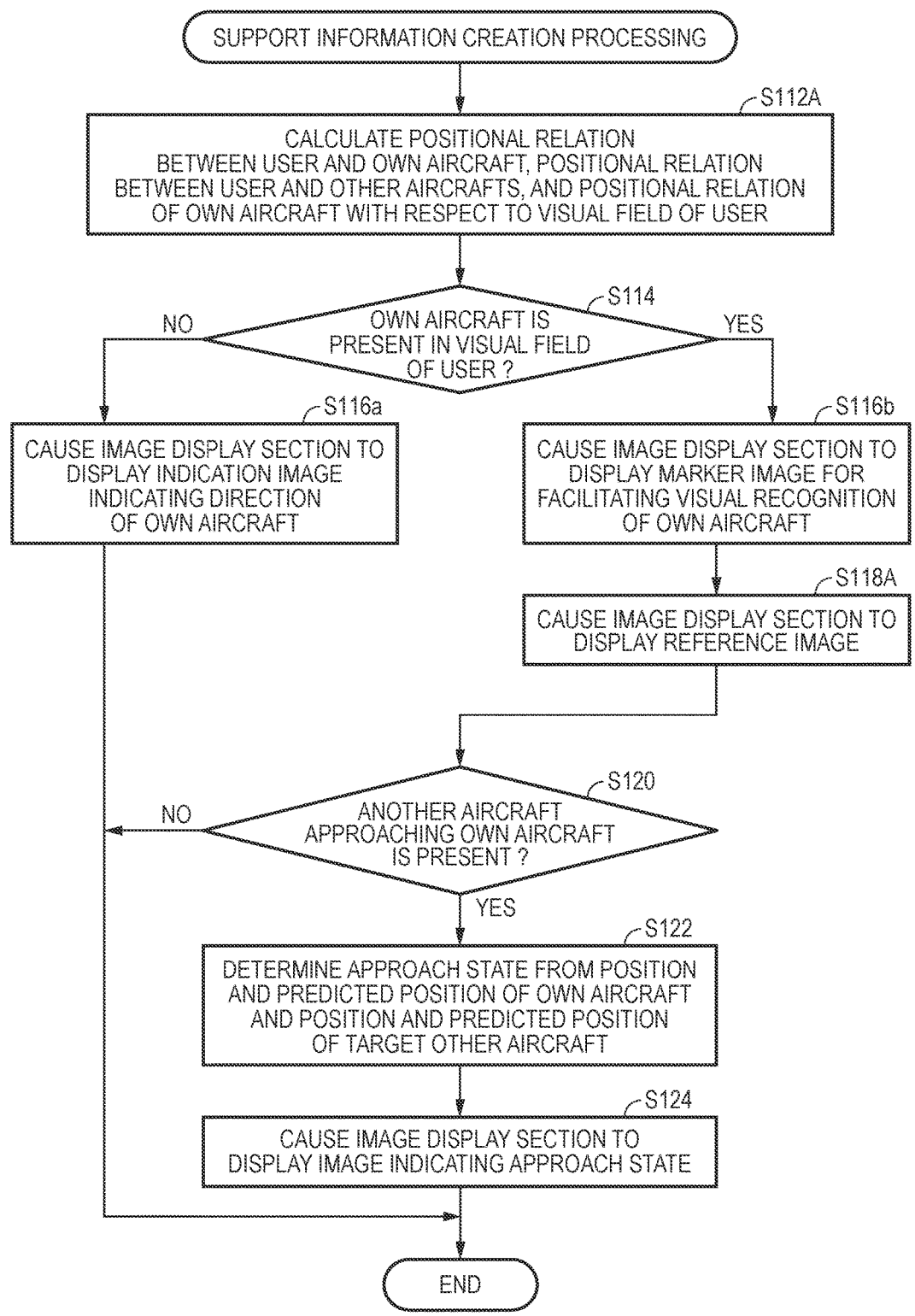
FIG. 21 is a flowchart for explaining support information creation processing by a support-information creating section.

FIG. 21 is a flowchart for explaining the support information creation processing by the support-information creating section 159Ab. In this flowchart, steps S112 and S118 of the support information creation processing by the support-information creating section 159*b* shown in FIG. 10 are replaced with steps S112A and S118A. Further, steps S120, S122, and S124 are added after step S118A.

In step S112A, as in step S112 (FIG. 10), the support-information creating section 159Ab calculates a positional relation between the user and the own aircraft 400 and calculates a positional relation of the own aircraft 400 with respect to the visual field of the user from data of the position and the visual field of the user included in the HMD state data 127 and data of the position of the own aircraft 400 included in the own aircraft state data 128. In step S112A, the support-information creating section 159Ab calculates a positional relation between the user and the other aircrafts from data of the position of the user included in the HMD state data 127 and data of the positions of the other aircrafts included in the other aircraft state data 129.

The support-information creating section 159Ab causes the image display section 20 to display an indication image as an AR image according to presence or absence of the own aircraft 400 in an outside scene corresponding to the visual field of the user (step S116*a*) or causes the image display section 20 to display a marker image as the AR image (step S116*b*).

In step S118A, as in step S118 (FIG. 10), the support-information creating section 159Ab sets a reference image based on the state information of the own aircraft as a support image, creates a reference image based on the state information of the other aircrafts as a support image, and causes the image display section 20 to display the references images as AR images. Note that step S118A may be omitted.

Figure 22:
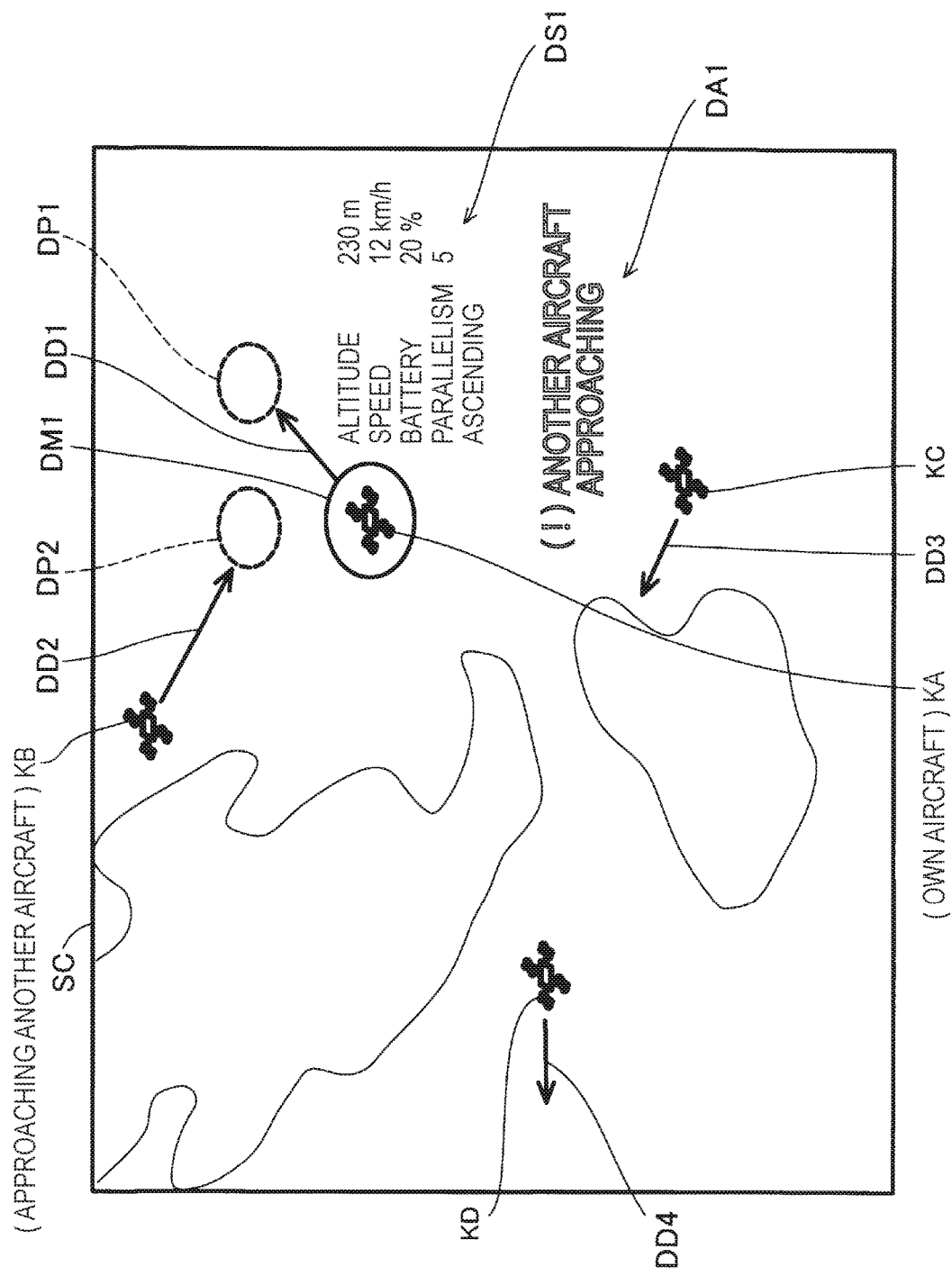
FIG. 22 is an explanatory diagram showing an example of display of a marker image and reference images to an own aircraft and display of reference images to other aircrafts.

FIG. 22 is an explanatory diagram showing an example of display of a marker image and reference images to the own aircraft and display of reference images to the other apparatuses. Like FIG. 12, FIG. 22 shows a state in which a marker image DM1 having an elliptical frame shape surrounding the own aircraft KA in the outside scene SC with a solid line is displayed as a marker image to the own aircraft 400 (KA). FIG. 22 shows a state in which, as reference images, the reference information image DS1 indicating state information of the own aircraft KA, the moving direction image DD1 indicating a moving direction of the own aircraft KA, and the predicted position image DP1 indicating a predicted position after is seconds are superimposed and displayed. Further, FIG. 22 shows a state in which moving direction images DD2, DD3, and DD4 indicating moving directions of three other aircrafts KB, KC, and KD present in the outside scene SC corresponding to the visual field of the user are superimposed and displayed to the other aircrafts KB, KC, and KD as reference images. The lengths of the moving direction images may be changed according to speeds.

In step S120, the support-information creating section 159Ab determines presence or absence of notification to the effect that approaching another aircraft satisfying the first approach condition is present in the state information of the own aircraft acquired from the management server 300. When the notification is absent, the support-information creating section 159Ab directly ends the processing. When the notification is present, the support-information creating section 159Ab determines an approach state of the own aircraft and the other aircraft from the position and a predicted position of the own aircraft and the position and a predicted position of the notification target other aircraft (step S124). When the approach state of the own aircraft and the other aircraft satisfies the second approach condition decided in advance, the support-information creating section 159Ab creates an image indicating information indicating the approach state of the other aircraft as a reference image and causes the image display section 20 to superimpose and display the reference image on the outside scene (step S126). Note that the second approach condition is set to, for example, a condition that the other aircraft is present within a range of a radius set short according to a degree of approach decided in advance or a predicted position after is seconds is within the range of the radius with respect to the own aircraft. Various images such as "information simply indicating that an approaching aircraft is present", "information indicating that attention should be paid to approach", "information for warning that there is possibility of collision", and "information for warning collision avoidance" are conceivable according to lengths of the radius.

In FIG. 22, a state in which the other aircraft KB is approaching the own aircraft KA is shown as an example. An example is shown in which "(!) Another aircraft approaching" is displayed as a notification image DA1. When approaching another aircraft is present, a predicted position image of the other aircraft may be set as a reference image concerning the other aircraft to cause the image display section 20 to superimpose and display the predicted position image. In FIG. 22, an example is shown in which a predicted position image DP2 of the approaching other aircraft KB is displayed. By causing the image display section 20 to display the notification image concerning the approach of the other aircraft in this way, the user can easily recognize the presence of the approaching other aircraft without taking the user's eyes off the own aircraft. It is possible to improve operability. By causing the image display section 20 to display a predicted position of the approaching other aircraft in addition to a present position and a predicted position of the own aircraft, it is possible to visually and intuitively grasp a degree of the approach to improve operability.

Note that, in the second embodiment, the example is explained in which the marker image DM1, the moving direction image DD1, the predicted position image DP1, and the reference information image DS1 same as those in the first embodiment are displayed as the support images of the own aircraft KA. However, the support images are not limited to this. The various modifications explained in the first embodiment are applicable. In the second embodiment, the example is explained in which the moving direction images DD2 to DD4 and the predicted position image DP2 are displayed as the support images of the other aircrafts KB to KD. However, as the support images, as in the case of the own aircraft KA, the modifications concerning the moving direction image DD1 and the predicted position image DP1 explained in the first embodiment are applicable.

Figure 23:
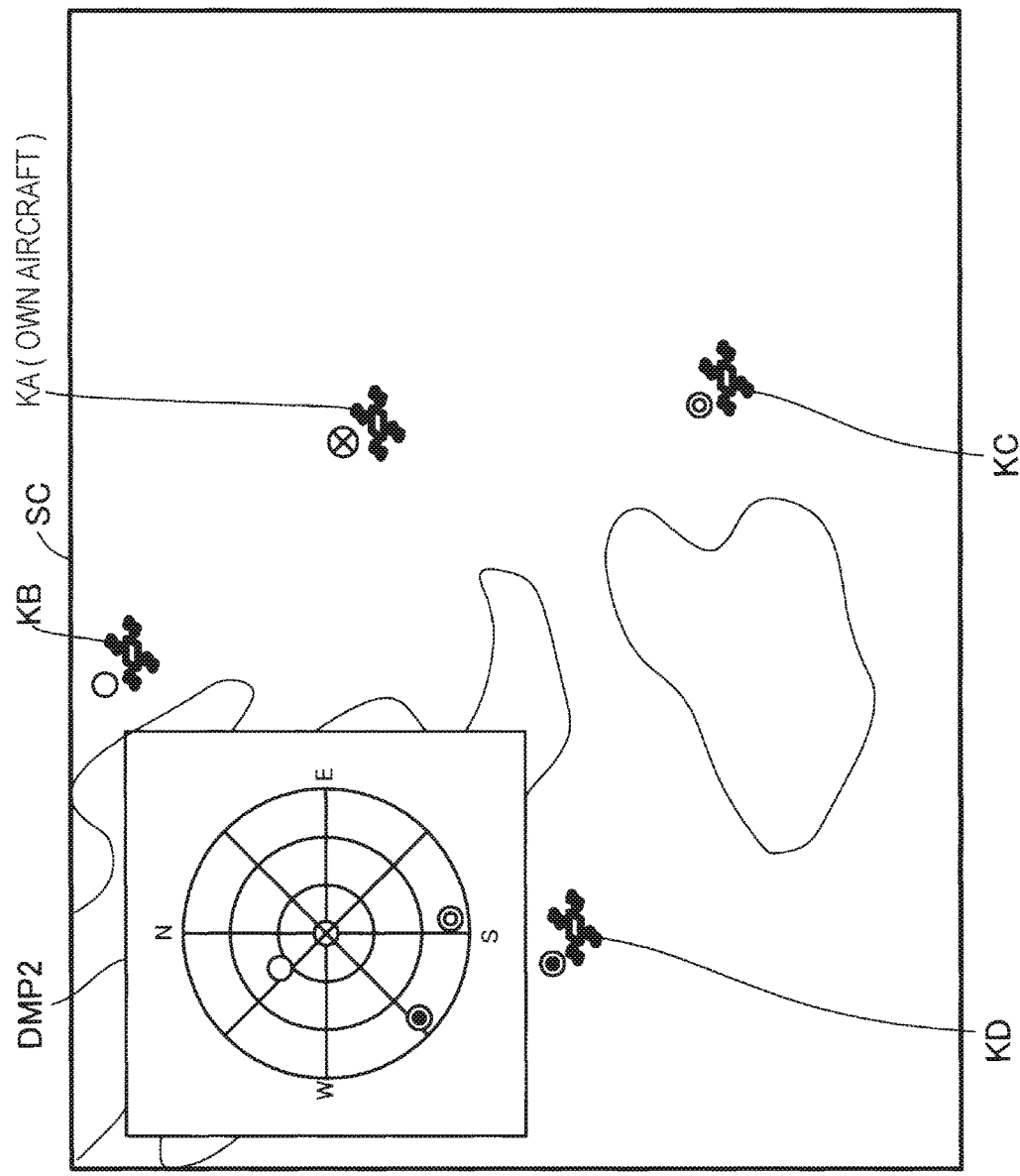
FIG. 23 is an explanatory diagram showing a modification in which a map image is displayed as a support image.

FIG. 23 is an explanatory diagram showing a modification in which a map image is displayed as a support image. In order to grasp a planar positional relation between the own aircraft and the other aircrafts, as shown in FIG. 23, a map image DMP2 may be superimposed and displayed on the outside scene SC. The map image DMP2 is an example in which a positional relation between the own aircraft KA and three other aircrafts KB, KC, and KD present around the own aircraft KA is shown using a concentric circle map centering on the own aircraft. In order to distinguish the own aircraft KA and the other aircrafts KB, KC, and KD, different marker images are respectively allocated to the aircrafts and the positions of the aircrafts are indicated by the marker images in the map image DMP2. Consequently, it is possible to easily grasp in what kind of positional relation the other aircrafts KB, KC, and KD are centering on the own aircraft KA. Therefore, it is possible to improve operability of the user.

C. Modifications

Note that the invention is not limited to the first and second embodiments and the modifications of the embodiments. It is possible to carry out the invention in various forms without departing from the spirit of the invention. For example, modifications explained below are possible.

C1. Modification 1

In the second embodiment, the example is explained in which the HMD 100A and the remote control device 500A are connected to the management server 300 via the Internet INT. However, the HMD 100A and the remote control device 500A may be connected to the management server 300 via a LAN rather than the Internet INT.

C2. Modification 2

In the second embodiment, the example is explained in which the marker image is displayed only to the own aircraft. However, for example, in the case of a competition in which a plurality of unmanned aircrafts are simultaneously flown to compete for superiority, different marker images are respectively allocated to a plurality of unmanned aircrafts to enable users of the respective unmanned aircrafts to distinguish not only own aircrafts but also the other aircrafts and users of the other aircrafts.

Wireless communication may be performed via respective mounted HMDs between users of approaching aircrafts to perform information exchange such as a request for collision avoidance.

C3. Modification 3

In the embodiments, the example is explained in which the support image is superimposed and displayed on the outside scene visually recognized through the light guide plates. However, the outside scene may be not transmitted and an image captured by the camera of the HMD and various support images concerning a state of the own aircraft may be superimposed and displayed. The outside scene may be not transmitted and a captured image by the image sensor (the camera) mounted on the own aircraft and various kinds of reference information concerning a state of the own aircraft may be superimposed and displayed.

C4. Modification 4

In the embodiments, the example is explained in which, when the user wearing the HMD pilots the unmanned aircraft (the own aircraft) using the remote control device while visually recognizing the unmanned aircraft (the own aircraft), in order to improve distinctiveness and operability of the own aircraft, the user causes the HMD to display a support image. However, the invention is also applicable when the user causes the unmanned aircraft to autonomously fly on the basis of flight control data set in advance. For example, a monitoring person can wear the HMD and perform various kinds of control on the unmanned aircraft referring to a support image displayed on the image display section of the HMD while visually recognizing the monitored unmanned aircraft.

C5. Modification 5

In the embodiments and the modifications, a part of the components realized by hardware may be replaced with software. Conversely, a part of the components realized by software may be replaced with hardware.

C6. Modification 6

In the embodiments, the configuration of the HMD is illustrated. However, the configuration of the HMD can be optionally decided without departing from the spirit of the invention. For example, addition, deletion, conversion, and the like of the components can be performed.

In the embodiments, the functional sections of the control device 10 and the image display section 20 are explained. The functional sections can be optionally changed. For example, forms explained below may be adopted. A form in which the storage function section 122 and the control function section 150 are mounted on the control device 10 and only a display function is mounted on the image display section 20. A form in which the storage function section 122 and the control function section 150 are mounted on both of the control device 10 and the image display section 20. A form in which the control device 10 and the image display section 20 are integrated. In this case, for example, all the components of the control device 10 are included in the image display section 20. The image display section 20 is configured as an eyeglass-type wearable computer. A form in which a smartphone or a portable game machine is used instead of the control device 10. A form in which the control device 10 and the image display section 20 are connected by wireless communication and the connection cable 40 is removed. In this case, for example, power supply to the control device 10 and the image display section 20 may be wirelessly carried out.

C7. Modification 7

In the embodiments, the configuration of the control device is illustrated. However, the configuration of the control device can be optionally decided without departing from the spirit of the invention. For example, addition, deletion, conversion, and the like of the components can be performed.

In the embodiments, the control function section 150 operates when the main processor 140 executes the computer program in the storage function section 122. However, various configurations can be adopted as the control function section 150. For example, the computer program may be stored in the nonvolatile storing section 121, the EEPROM 215, the memory 118, or other external storage devices (including storage devices such as USB memories inserted into various interfaces and an external device such as a server connected via a network) instead of or together with the storage function section 122. The functions of the control function section 150 may be realized using ASICs (Application Specific Integrated Circuits) designed to realize the functions.

C8. Modification 8

In the embodiments, the configuration of the image display section is illustrated. However, the configuration of the image display section can be optionally decided without departing from the spirit of the invention. For example, addition, deletion, conversion, and the like of the components can be performed.

Figure 24:
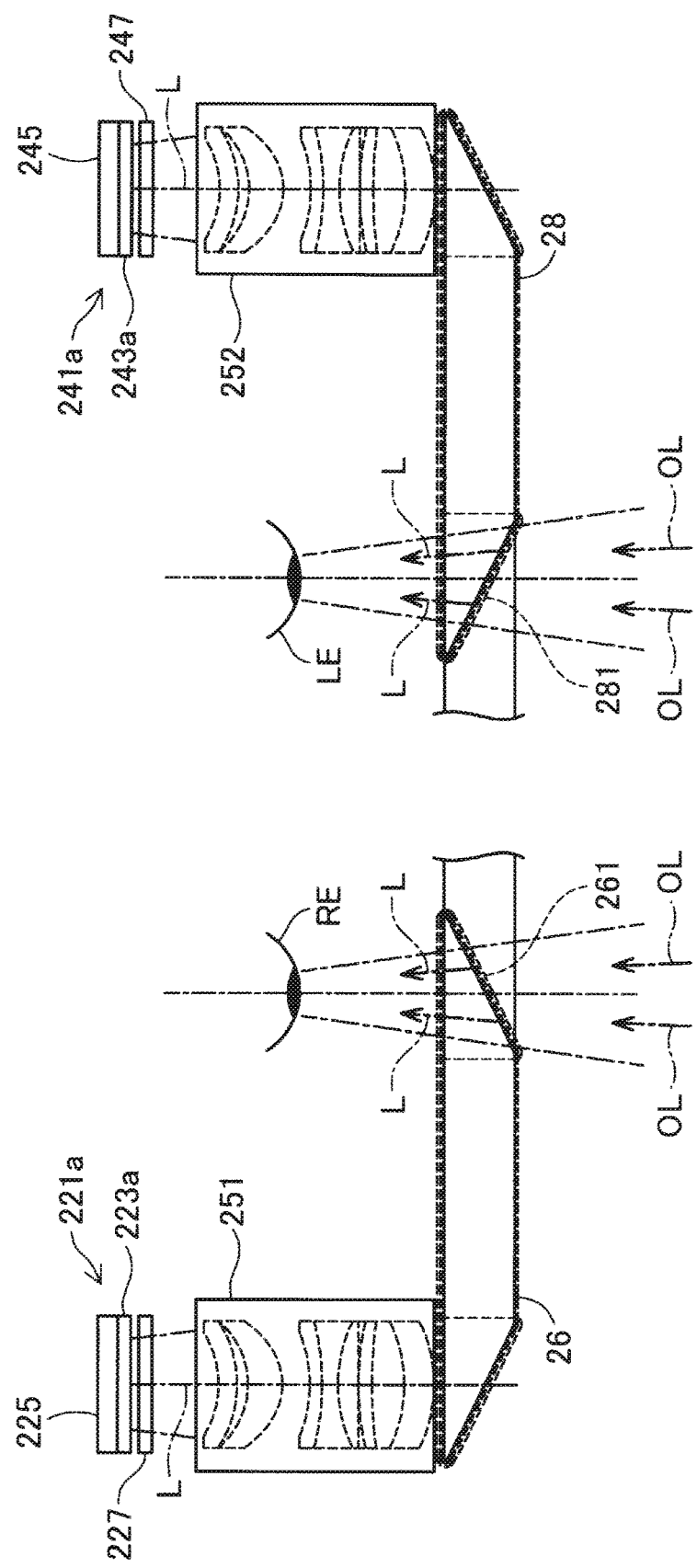
FIG. 24 is a main part plan view showing the configuration of an optical system included in an image display section in the modification.

FIG. 24 is a main part plan view showing the configuration of an optical system included in an image display section in a modification. In the image display section in the modification, an OLED unit 221*a* corresponding to the right eye RE of the user and an OLED unit 241*a* corresponding to the left eye LE of the user are provided. The OLED unit 221*a* corresponding to the right eye RE includes an OLED panel 223*a* that emits light in white and the OLED driving circuit 225 that drives the OLED panel 223*a* to emit light. A modulating element 227 (a modulating device) is disposed between the OLED panel 223*a* and the right optical system 251. The modulating element 227 is configured by, for example, a transmission-type liquid crystal panel. The modulating element 227 modulates the light emitted by the OLED panel 223*a* to generate the image light L. The image light L transmitted through the modulating element 227 to be modulated is guided to the right eye RE by the right light guide plate 26.

The OLED unit 241*a* corresponding to the left eye LE includes an OLED panel 243*a* that emits light in white and the OLED driving circuit 245 that drives the OLED panel 243*a* to emit light. A modulating element 247 (a modulating device) is disposed between the OLED panel 243*a* and the left optical system 252. The modulating element 247 is configured by, for example, a transmission-type liquid crystal panel. The modulating element 247 modulates the light emitted by the OLED panel 243*a* to generate the image light L. The image light L transmitted through the modulating element 247 to be modulated is guided to the left eye LE by the left light guide plate 28. The modulating elements 227 and 247 are connected to a not-shown liquid crystal driver circuit. The liquid crystal driver circuit (a modulating-device driving section) is mounted on, for example, a substrate disposed in the vicinity of the modulating elements 227 and 247.

With the image display section in the modification, the right display unit 22 and the left display unit 24 are respectively configured as video elements including the OLED panels 223*a* and 243*a* functioning as light source sections and the modulating elements 227 and 247 that modulate lights emitted by the light source sections and output image lights including a plurality of color lights. Note that the modulating devices that modulate the lights emitted by the OLED panels 223*a* and 243*a* are not limited to the configuration in which the transmission-type liquid crystal panel is adopted. For example, a reflection-type liquid crystal panel may be used instead of the transmission-type liquid crystal panel. A digital micro-mirror device may be used. The HMD 100 may be the HMD 100 of a laser retinal projection type.

In the embodiments, the eyeglass-type image display section 20 is explained. However, a form of the image display section 20 can be optionally changed. For example, the image display section 20 may be worn like a hat or may be incorporated in a body protector such as a helmet. The image display section 20 may be configured as a HUD (Head Up Display) mounted on vehicles such as an automobile and an airplane or other transportation means.

In the embodiments, as the optical system that guides image light to the eyes of the user, the configuration is illustrated in which a virtual image is formed on a part of the right light guide plate 26 and the left light guide plate 28 by the half mirrors 261 and 281. However, the configuration can be optionally changed. For example, a virtual image may be formed in regions occupying the entire (or most of) right guide plate 26 and left light guide plate 28. In this case, an image may be reduced by operation for changing a display position of the image. The optical element according to the invention is not limited to the right light guide plate 26 and the left light guide plate 28 including the half mirrors 261 and 281. Any form can be adopted as long as an optical component (e.g., a diffraction grating, a prism, or holography) that makes image light incident on the eyes of the user is used.

C9. Modification 9

In the second embodiment, the example is explained in which the management server 300 determines presence or absence of another aircraft satisfying the first approaching condition and, when another aircraft satisfying the second approach condition is present, causes the image display section 20 to display information indicating an approach state of the other aircraft. However, the control device 10A of the HMD 100A may determine presence or absence of another aircraft satisfying the first approach condition. The management server 300 may determine presence or absence of another aircraft satisfying the second approach condition, include a notification of the presence or absence of another aircraft in state information, and transmit the notification to the control device 10A.

C10. Modification 10

In the embodiments, the unmanned aircraft (the unmanned aerial vehicle) capable of being remotely piloted or autonomously flying such as a Drone is explained as the example. However, the invention is not limited to the embodiments. The invention is also applicable to various remotely operated or automatically operated mobile bodies such as a helicopter, an airplane, a rocket, a hot air balloon, a train, a submarine, a ship, an artificial satellite, a vehicle for business use such as a bus, an automobile, a robot, and toys of the foregoing. Besides the mobile bodies, the invention is applicable when remotely operating apparatuses for construction site such as a crane incidental to a truck, a power shovel, and a bulldozer, agricultural apparatuses such as a snowplow, a lawn mower, a tractor, a combine harvester, a cultivator, a rice planting machine, a crop-dusting machine, various forestry apparatuses, various fishery apparatuses, various mining industry apparatuses, and the like.

C11. Modification 11

In the embodiments, the example is explained in which, as the support images showing the support information, the indication image indicating a direction in which the own aircraft (the unmanned aircraft) is located, the marker image indicating the position of the own aircraft, the moving direction image indicating a moving direction, the predicted position image indicating a predicted position, and the reference information image indicating information related to an aircraft state are displayed. As the reference information image, in the first embodiment, the altitude, the speed, the remaining battery power, the parallelism of the aircraft, and the information indicating that the aircraft is ascending are illustrated. In the second embodiment, the notification image indicating information for notifying approach to another aircraft is further illustrated. The support information is not limited to the examples in the embodiments. Various kinds of information for improving operability of the user, for example, information concerning flight and an operation place such as a selection guide of an operation mode, a change in a wind direction, future weather, and approach of an atmospheric depression may be applied and displayed as the support images as appropriate. As explained in the modification 10, in apparatuses other than the unmanned aircraft, various kinds of information suitable of improving operability only have to be applied as the support information as appropriate. For example, in the case of the crane, information such as a moving range of the cane and a position of a hoisting hook of the crane may be applied as the support information.

The invention is not limited to the embodiments, the examples, and the modifications explained above and can be realized in various configurations without departing from the spirit of the invention. For example, the technical features in the embodiments, the examples, and the modifications corresponding to the technical features in the aspects described in the summary of the invention can be replaced or combined as appropriate in order to solve a part or all of the problems explained above or in order to achieve a part or all of the effects explained above. Unless the technical features are explained as essential technical features in this specification, the technical features can be deleted as appropriate.

The entire disclosure of Japanese Patent Application No. 2017-001682, filed Jan. 10, 2017 is expressly incorporated by reference herein.

What is claimed is:

1. A transmission-type head-mounted display device comprising:
an image display configured to, in a state in which the head-mounted display device is mounted on a head of a user, transmit an outside scene to cause the user to visually recognize the outside scene and superimpose a virtual image on the outside scene to cause the user to visually recognize the virtual image;
a wireless communication transceiver configured to perform wireless communication with an own aircraft, which is a mobile body set as an operation target object of the user; and
a processor,
wherein the processor is configured to:
control the image display;
detect a position of the user wearing the image display;
detect a visual field of the user;
   acquire, via the wireless communication transceiver, state information including a position of the own aircraft;
   calculate a positional relation of the position of the own aircraft with respect to the visual field of the user;
   determine whether the own aircraft is absent or present in the outside scene corresponding to the visual field of the user, based on the positional relation; and
   when the own aircraft is present in the outside scene corresponding to the visual field of the user, create a first support image including support information for operation of the own aircraft and cause the image display to display the first support image as the virtual image.

2. The head-mounted display device according to claim 1, wherein the processor acquires, via the wireless communication transceiver, the state information transmitted from the own aircraft to a remote control device used for controlling the own aircraft.

3. The head-mounted display device according to claim 2, wherein the processor further acquires, via the wireless communication transceiver, state information of other aircrafts, which are one or more mobile bodies other than the own aircraft, transmitted from the other aircrafts to each of one or more remote control devices used for controlling each of the other aircrafts.

4. The head-mounted display device according to claim 3, wherein the processor further causes the image display to display, to the own aircraft included in the visual field of the user, as the virtual image, moving direction information indicating a moving direction included in the state information of the own aircraft and causes the image display to display, to the other aircrafts included in the visual field of the user, as the virtual image, moving direction information indicating a moving direction included in the state information of the other aircrafts.

5. The head-mounted display device according to claim 3, wherein, when another aircraft satisfying a first approach condition is present, the processor further causes, on a basis of the position of the own aircraft and a predicted position after elapse of predetermined time included in the state information of the own aircraft and a position of the other aircraft and a predicted position after the elapse of the predetermined time included in state information of the other aircraft satisfying the first approach condition, the image display to display, as the virtual image, information indicating an approach state of the other aircraft when the own aircraft and the other aircraft satisfy a second approach condition.

6. The head-mounted display device according to claim 2, wherein the processor further causes the image display to display, to the own aircraft included in the visual field of the user, as the virtual image, moving direction information indicating a moving direction included in the state information of the own aircraft.

7. The head-mounted display device according to claim 1, wherein, when the own aircraft is absent in the outside scene corresponding to the visual field of the user, the processor causes the image display to display, as the virtual image, a second support image indicating a direction in which the own aircraft is located.

8. The head-mounted display device according to claim 1, wherein the first support image is a marker image for distinguishing the own aircraft.

9. The head-mounted display device according to claim 1, wherein the processor changes a state of the support image according to a state of the outside scene to make it easy to distinguish the support image from the outside scene.

10. A control method for a transmission-type head-mounted display device including an image display configured to, in a state in which the head-mounted display device is mounted on a head of a user, transmit an outside scene to cause the user to visually recognize the outside scene and superimpose a virtual image on the outside scene to cause the user to visually recognize the virtual image, the control method comprising:
    acquiring state information including a position of an own aircraft, which is a mobile body set as an operation target object of the user;
    calculating a positional relation of the position of the own aircraft with respect to a visual field of the user;
    determining whether the own aircraft is absent or present in the outside scene corresponding to the visual field of the user, based on the positional relation; and
    when the own aircraft is present in the outside scene corresponding to the visual field of the user, creating a first support image including support information for operation of the own aircraft and causing the image display to display the first support image as the virtual image.

11. A non-transitory computer readable medium with instructions stored thereon for controlling a transmission-type head-mounted display device including an image display configured to, in a state in which the head-mounted display device is mounted on a head of a user, transmit an outside scene to cause the user to visually recognize the outside scene and superimpose a virtual image on the outside scene to cause the user to visually recognize the virtual image, that when executed by computer, perform the steps comprising:
    acquiring state information including a position of an own aircraft, which is a mobile body set as an operation target object of the user;
    calculating a positional relation of the position of the own aircraft with respect to a visual field of the user;
    determining whether the own aircraft is absent or present in the outside scene corresponding to the visual field of the user, based on the positional relation; and
    when the own aircraft is present in the outside scene corresponding to the visual field of the user, creating a first support image including support information for operation of the own aircraft and causing the image display to display the first support image as the virtual image.

\* \* \* \* \*